(12) United States Patent
Stener

(10) Patent No.: US 12,115,919 B2
(45) Date of Patent: Oct. 15, 2024

(54) MOUNTING SYSTEM WITH ANTI-ROTATION FEATURES FOR SUPPORTING AN ELECTRONIC DEVICE

(71) Applicant: Yonder Fund LLC, Dallas, TX (US)

(72) Inventor: Gavin Stener, Dallas, TX (US)

(73) Assignee: Yonder Fund LLC, Dallas, TX (US)

( * ) Notice: Subject to any disclaimer, the term of this patent is extended or adjusted under 35 U.S.C. 154(b) by 0 days.

(21) Appl. No.: 18/159,652

(22) Filed: Jan. 25, 2023

(65) Prior Publication Data

US 2024/0123913 A1   Apr. 18, 2024

Related U.S. Application Data

(60) Provisional application No. 63/416,405, filed on Oct. 14, 2022.

(51) Int. Cl.
| | | |
|---|---|---|
| B60R 11/02 | (2006.01) | |
| F16M 11/10 | (2006.01) | |
| B60R 11/00 | (2006.01) | |

(52) U.S. Cl.
CPC ......... B60R 11/0241 (2013.01); F16M 11/10 (2013.01); *B60R 2011/0003* (2013.01); *B60R 2011/0052* (2013.01); *B60R 2011/0073* (2013.01); *F16M 2200/022* (2013.01)

(58) Field of Classification Search
CPC ............. F16M 2200/024; F16M 11/08; F16M 11/2014
USPC .......................... 248/663, 481, 181.1–181.2, 248/288.31–288.51
See application file for complete search history.

(56) References Cited

U.S. PATENT DOCUMENTS

| | | | |
|---|---|---|---|
| 892,105 A | * | 6/1908 | White ................. F16L 3/202 248/62 |
| 1,536,985 A | * | 5/1925 | Swinford ............ F16M 11/242 411/935 |
| D208,918 S | | 10/1967 | Dole et al. |
| D225,204 S | | 11/1972 | Kendrick |
| 4,073,113 A | | 2/1978 | Oudot et al. |
| D251,467 S | | 4/1979 | Anderson |
| D271,312 S | | 11/1983 | Renteria |
| D275,065 S | | 8/1984 | Steiner |
| 4,469,261 A | | 9/1984 | Stapleton et al. |
| D282,759 S | | 2/1986 | Weissberg |
| 4,596,406 A | | 6/1986 | Van Vleet et al. |
| D290,719 S | | 7/1987 | Holloway |

(Continued)

FOREIGN PATENT DOCUMENTS

| | | |
|---|---|---|
| CN | 304763109.5 | 8/2018 |
| TW | D183200 | 5/2017 |

*Primary Examiner* — Christopher Garft
(74) *Attorney, Agent, or Firm* — Foley & Lardner LLP

(57) ABSTRACT

A mounting system for supporting an electronic device includes a mount and a connecting element coupled to the mount. The connecting element may include an interface body and a first plurality of engaging elements. The interface body may include a first body portion and a second body portion, and extend axially between an axial end of the connecting element and the first body portion. The second body portion may have a reduced diameter relative to the first body portion. The first plurality of engaging elements may be configured to engage with a clamp body to substantially prevent rotation of the clamp body with respect to the connecting element.

33 Claims, 14 Drawing Sheets

(56) References Cited

U.S. PATENT DOCUMENTS

| | | |
|---|---|---|
| D291,785 S | 9/1987 | Rahme |
| 4,948,313 A | 8/1990 | Zankovich |
| D317,331 S | 6/1991 | Holloway |
| D317,950 S | 7/1991 | Tse |
| 5,154,385 A | 10/1992 | Lindberg et al. |
| 5,231,785 A * | 8/1993 | Roberts .................. A01K 97/10 |
| | | 248/538 |
| 5,271,586 A | 12/1993 | Schmidt |
| 5,279,711 A | 1/1994 | Frankeny et al. |
| 5,305,700 A | 4/1994 | Strong et al. |
| 5,395,131 A | 3/1995 | Herrick |
| D357,400 S | 4/1995 | Sachs |
| D360,571 S | 7/1995 | Perry |
| D373,761 S | 9/1996 | Yu |
| D374,165 S | 10/1996 | Marshall |
| D375,065 S | 10/1996 | Duvernay et al. |
| D375,765 S | 11/1996 | Kawasaki |
| D376,780 S | 12/1996 | McCoy |
| D378,302 S | 3/1997 | Kin-Man Tse |
| D390,709 S | 2/1998 | Moore |
| 5,786,807 A | 7/1998 | Couch et al. |
| D399,847 S | 10/1998 | Seifert |
| D401,496 S | 11/1998 | Lambert et al. |
| 5,839,744 A | 11/1998 | Marks |
| 5,855,342 A | 1/1999 | Hawkins et al. |
| 5,890,726 A | 4/1999 | McCoy et al. |
| 5,893,744 A | 4/1999 | Wang |
| D409,182 S | 5/1999 | Tyler |
| 5,927,041 A | 7/1999 | Sedlmeier et al. |
| D414,761 S | 10/1999 | Oikawa et al. |
| 5,984,243 A | 11/1999 | Pfaller et al. |
| D440,845 S | 4/2001 | Lackey |
| D443,566 S | 6/2001 | Peterson |
| D455,199 S | 4/2002 | Lenart et al. |
| D506,916 S | 7/2005 | Sale, Jr. |
| D510,696 S | 10/2005 | Sale, Jr. |
| 7,025,315 B2 | 4/2006 | Carnevali |
| D521,314 S | 5/2006 | Ball |
| 7,070,374 B2 | 7/2006 | Womack et al. |
| D526,939 S | 8/2006 | Profitt et al. |
| D534,061 S | 12/2006 | Sakai |
| D551,937 S | 10/2007 | Krumpe et al. |
| D554,137 S | 10/2007 | Richter |
| 7,320,450 B2 * | 1/2008 | Carnevali .................. F16M 11/14 |
| | | 248/180.1 |
| 7,324,050 B2 | 1/2008 | Chung et al. |
| D567,060 S | 4/2008 | Busalt et al. |
| 7,401,995 B2 | 7/2008 | Senakiewich |
| 7,448,822 B2 | 11/2008 | Nebeker et al. |
| D587,713 S | 3/2009 | Sutton |
| D592,487 S | 5/2009 | Tedesco et al. |
| D594,735 S | 6/2009 | Hofer |
| D599,829 S | 9/2009 | Jorgensen et al. |
| 7,604,444 B2 | 10/2009 | Wu |
| D607,381 S | 1/2010 | Lekkas |
| 7,757,424 B2 * | 7/2010 | Follmar .................. A01K 97/10 |
| | | 248/521 |
| 7,774,973 B2 * | 8/2010 | Carnevali .................. F16M 11/10 |
| | | 248/516 |
| 7,849,630 B2 * | 12/2010 | Carnevali .................. A01K 97/10 |
| | | 43/21.2 |
| 8,100,600 B2 | 1/2012 | Blum |
| D657,783 S | 4/2012 | Mo |
| D658,184 S | 4/2012 | Chang et al. |
| D658,478 S | 5/2012 | Wall |
| D673,443 S | 1/2013 | Elrod |
| D674,681 S | 1/2013 | Gorman |
| D686,622 S | 7/2013 | Rey et al. |
| 8,497,760 B2 | 7/2013 | Whalen et al. |
| D691,027 S | 10/2013 | Rainer |
| D698,357 S | 1/2014 | Mainville et al. |
| D699,176 S | 2/2014 | Salomon et al. |
| D703,998 S | 5/2014 | Funnell et al. |
| D718,298 S | 11/2014 | Aspinall et al. |
| D720,199 S | 12/2014 | Clements et al. |
| D722,815 S | 2/2015 | Fuller et al. |
| 8,944,399 B2 * | 2/2015 | Sutherland .................. A01K 97/10 |
| | | 248/222.13 |
| D723,559 S | 3/2015 | Hein et al. |
| D732,519 S | 6/2015 | Aspinall et al. |
| D732,932 S | 6/2015 | Ng et al. |
| D733,116 S | 6/2015 | Aspinall et al. |
| D735,722 S | 8/2015 | Amann |
| D736,595 S | 8/2015 | Moore et al. |
| D740,589 S | 10/2015 | Ng |
| D741,689 S | 10/2015 | Metzler |
| D748,640 S | 2/2016 | Hart |
| D749,405 S | 2/2016 | White |
| D750,951 S | 3/2016 | Fuller et al. |
| D752,976 S | 4/2016 | Koffel et al. |
| D753,983 S | 4/2016 | Toye |
| D754,527 S | 4/2016 | Green et al. |
| D759,465 S | 6/2016 | Reed |
| D760,066 S | 6/2016 | Krenek |
| D761,094 S | 7/2016 | Hooten |
| D764,597 S | 8/2016 | Kujawski et al. |
| D772,689 S | 11/2016 | Zimmer |
| 9,494,400 B1 | 11/2016 | Allemann et al. |
| 9,506,600 B1 | 11/2016 | Li |
| D776,091 S | 1/2017 | Spio |
| D780,480 S | 3/2017 | Prince et al. |
| D789,177 S | 6/2017 | Carnevali |
| D790,325 S | 6/2017 | Gupta |
| D790,545 S | 6/2017 | Dannenberg et al. |
| 9,671,060 B1 | 6/2017 | Cifers |
| D792,418 S | 7/2017 | Stener |
| 9,717,329 B2 | 8/2017 | Hazzard et al. |
| D799,067 S | 10/2017 | Forsberg |
| D799,690 S | 10/2017 | Kawamura et al. |
| D807,152 S | 1/2018 | Hansen |
| D808,243 S | 1/2018 | Clements et al. |
| 9,863,576 B1 | 1/2018 | Cifers |
| 9,879,819 B1 | 1/2018 | Cifers |
| D810,008 S | 2/2018 | Mollison et al. |
| D810,076 S | 2/2018 | Lee et al. |
| D812,056 S | 3/2018 | Guermeur |
| 9,923,511 B2 | 3/2018 | Xie |
| D816,373 S | 5/2018 | Schwandt et al. |
| D818,349 S | 5/2018 | White |
| 10,027,273 B2 | 7/2018 | West et al. |
| D828,482 S | 9/2018 | Alldredge et al. |
| D834,020 S | 11/2018 | Pascucci |
| D839,216 S | 1/2019 | Kim et al. |
| D843,199 S | 3/2019 | Stener |
| D848,671 S | 5/2019 | Neuhaus et al. |
| D849,502 S | 5/2019 | Lucic, III |
| D860,198 S | 9/2019 | Engwall et al. |
| D860,522 S | 9/2019 | Zhan |
| D868,010 S | 11/2019 | Bard et al. |
| D879,671 S | 3/2020 | Siegel |
| D884,661 S | 5/2020 | Kim et al. |
| 10,921,088 B2 * | 2/2021 | Rentz .................. F41B 5/1426 |
| 11,572,021 B2 | 2/2023 | Stener |
| 11,635,155 B2 * | 4/2023 | Carnevali .................. F16B 7/187 |
| | | 285/305 |
| 2001/0045725 A1 | 11/2001 | McCoy et al. |
| 2002/0166936 A1 * | 11/2002 | Carnevali .................. F16M 11/14 |
| | | 248/288.31 |
| 2004/0251388 A1 | 12/2004 | Williams |
| 2005/0045779 A1 | 3/2005 | Nan |
| 2005/0092876 A1 * | 5/2005 | Carnevali .................. F16M 13/022 |
| | | 248/160 |
| 2005/0104327 A1 | 5/2005 | Irgens et al. |
| 2006/0000957 A1 * | 1/2006 | Carnevali .................. F16M 11/2078 |
| | | 248/181.1 |
| 2006/0279067 A1 | 12/2006 | Irgens et al. |
| 2007/0120036 A1 | 5/2007 | Olle et al. |
| 2008/0115344 A1 * | 5/2008 | Carnevali .................. B60R 11/02 |
| | | 29/428 |
| 2008/0272574 A1 | 11/2008 | Stuart |
| 2009/0026730 A1 | 1/2009 | Frantz |
| 2009/0079164 A1 | 3/2009 | Columbia |

(56) References Cited

U.S. PATENT DOCUMENTS

| | | |
|---|---|---|
| 2009/0253521 A1* | 10/2009 | Arden .................. F16D 1/10 |
| | | 464/32 |
| 2010/0276558 A1 | 11/2010 | Faust et al. |
| 2012/0045276 A1 | 2/2012 | Carnevali |
| 2013/0248668 A1 | 9/2013 | Lu et al. |
| 2015/0030386 A1 | 1/2015 | Carnevali |
| 2018/0306233 A1 | 10/2018 | Burton |
| 2018/0345476 A1 | 12/2018 | Carnevali |
| 2018/0347749 A1 | 12/2018 | Carnevali |
| 2018/0363842 A1 | 12/2018 | Carnevali |

\* cited by examiner

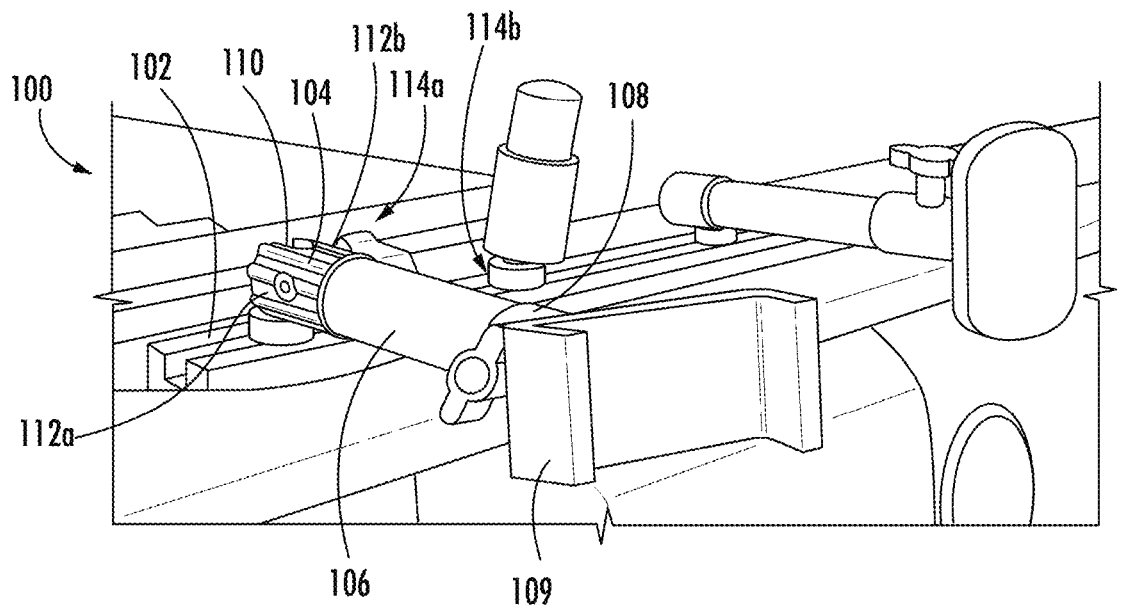
FIG. 1
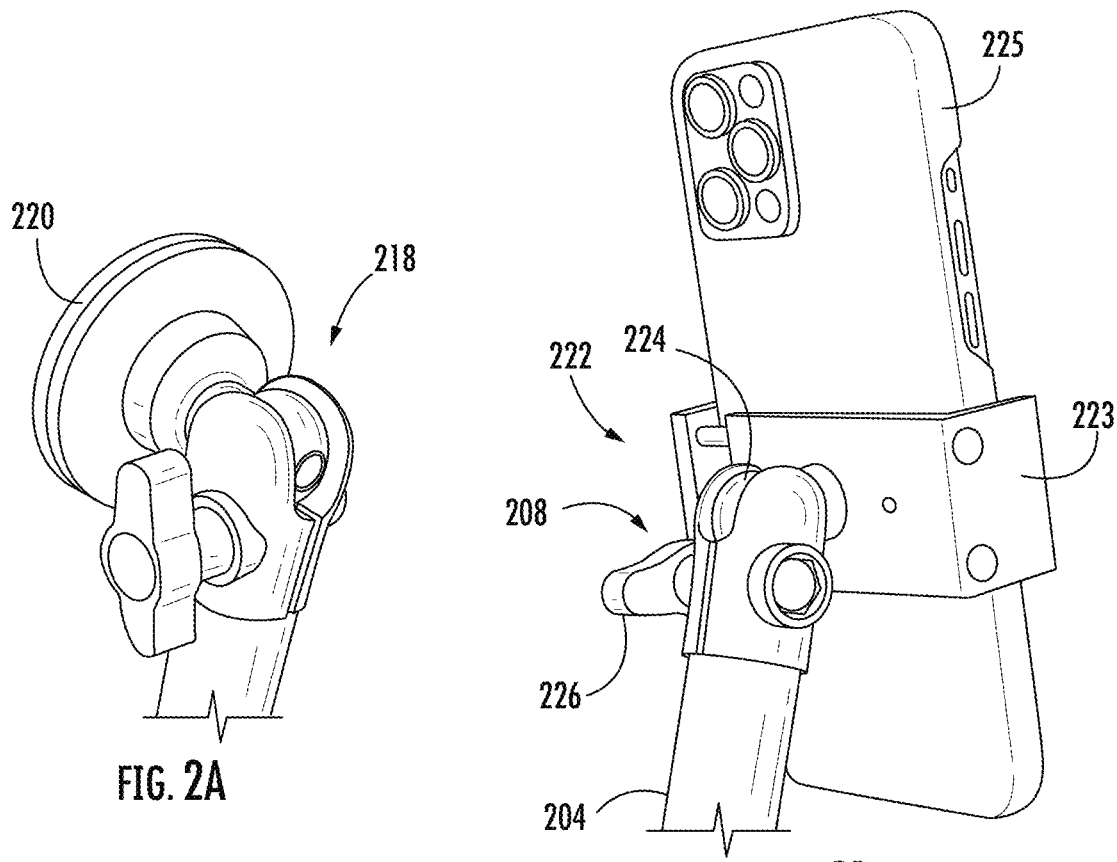
FIG. 2A
FIG. 2B

MOUNTING SYSTEM WITH ANTI-ROTATION FEATURES FOR SUPPORTING AN ELECTRONIC DEVICE

CROSS-REFERENCE TO RELATED PATENT APPLICATIONS

This application claims the benefit of and priority to U.S. Provisional Patent Application No. 63/416,405, filed Oct. 14, 2022, the disclosure of which is hereby incorporated by reference in its entirety.

BACKGROUND

With the wide adoption of mobile electronic devices, such as smartphones and tablets, the use of the mobile electronic devices in everyday life has become pervasive. Mobile apps, such as mapping apps for providing directions to a vehicle operator, have become commonly used in both consumer and commercial applications.

One challenge for users of the mobile devices in vehicles is safety in using the mobile devices during vehicle operation because holding the device leaves only one hand to control the vehicle, and placing the electronic device on a lap, seat, or center console may distract the operator. To help with safety for operators when using mobile devices, aftermarket electronic device mounting systems that are mounted onto a dashboard or other vehicle surface have been developed. Depending on the application, such mounting systems may be subject to large vibration or rotational forces during operation. This problem may be exacerbated in conditions where the mobile device is cantilevered away from the mounting system, or is supported at only one end of the clamping component that connects to the mobile device. If not properly mitigated, these forces can cause the arms and/or clamping components of the mounting system to move (e.g., rotate) and/or reposition themselves, which can result in the user having to re-adjust the support components while operating the vehicle. As such, there is a need for a vehicular mobile device mounting system and mounting systems for non-vehicular applications that offer improved stability in supporting mobile electronic devices, particularly under rotational loading.

SUMMARY

To provide for improved support of mobile electronic devices in various applications, a mounting system for vehicles such as cars, boats, aircraft, or any other moving form of transportation may include engaging features that are specifically designed to improve rotational stability of clamped components within the mounting system. The mounting system and features provided herein may be used for non-vehicular uses and for supporting non-electronic devices, as well. These engaging components and features may be integrated with the connecting elements of the mounting system in such a way as to allow locking of the mount and mobile device in a variety of positions without affecting the functionality of the clamp assembly components. In at least one embodiment, the mobile mounting system is designed to improve strength under rotational loading while at the same time ensuring freedom-of-angular rotation of clamp assembly components toward to one another during assembly (e.g., without reducing the compression or holding force applied by clamp assembly components to a ball mount).

For example, the mounting system may include an elongated shaft for supporting a mobile device above a vehicle surface and a clamp assembly disposed at an end of the shaft. The clamp assembly may include a connecting element such as a plug that is inserted or otherwise coupled to the shaft to mount the clamp assembly to the shaft. The clamp assembly may also include clamp bodies that are installed over the connecting element and that are compressed against the connecting element and a ball or pivot mount that allows a user to adjust the position and/or orientation of their mobile device. In at least one embodiment, the connecting element and/or ball may include geometric inhibitors (e.g., engaging elements) that increase resistance to rotation or self-movement of the clamp assembly or ball mount about a center of rotation under load. In one implementation, the connecting element and/or ball mount include geometric protrusions and/or indentations that engage with the clamp bodies to increase resistance to rotational loading. For example, the connecting element may include teeth or splines arranged along a perimeter thereof in a repeating pattern that allow clocking of the clamp assembly into different rotational positions during assembly, but that engage with the clamp body under compression to prevent rotation during use. Similarly, the ball mount may include a ball having protrusions or indentations along its outer surface that interface with the clamp bodies in a similar manner as the connecting element. The protrusions and/or indentations may be formed in various geometric shapes and may be positioned to facilitate adjustment of the rotational position of the ball within the clamp bodies (e.g., to any rotational position within the clamp bodies) during assembly without sacrificing the holding force provided under compression.

In at least one embodiment, the clamp bodies include an insert that engages the ball mount (the protrusions and/or indentations on the ball) to further increase the holding force, and to also provide energy absorption in response to shock and/or vibrational loads. The insert may be recessed into the inner surface of the clamp bodies and may include clocking features to prevent relative rotation between the insert and the clamp bodies. In some embodiments, the insert may be formed from a different (e.g., softer) material than the ball mount and may be configured to engage with the protrusions and/or indentations in the ball to further increase the holding force.

One embodiment of the present disclosure relates to a mounting system for supporting an electronic device. The system includes a mount and a connecting element coupled to the mount. The mount may be configured to enable securing the mounting system to a structural feature of a system in which the mounting system is being transported. The connecting element may include an interface body and a first plurality of engaging elements. The interface body may include a first body portion and a second body portion, and extend axially between an axial end of the connecting element and the first body portion. The second body portion may have a reduced diameter relative to the first body portion. The first plurality of engaging elements may be disposed on at least one of the first body portion or the second body portion. The first plurality of engaging elements may extend along a perimeter of the first body portion or the second body portion. The first plurality of engaging elements may be configured to engage with a clamp body to substantially prevent rotation of the clamp body with respect to the connecting element.

Another embodiment of the present disclosure relates to a connecting element for use in a mounting system for supporting an electronic device. The connecting element may include a base, an interface body, and a first plurality of engaging elements. The flange may extend radially away from the base. The interface body may include a first body portion and a second body portion extending axially between the base and the first body portion. The second body portion may have a reduced diameter relative to the first body portion. The first plurality of engaging elements may be disposed on at least one of the first body portion or the second body portion. The first plurality of engaging elements may extend in a repeating pattern along a perimeter of the first body portion or the second body portion. The first plurality of engaging elements may be configured to engage with a clamp body to substantially prevent rotation of the clamp body with respect to the connecting element.

Yet another embodiment of the present disclosure relates to a method of assembling a mounting system for supporting an electronic device. The method may include engaging a pair of clamp bodies with a connecting element by (i) inserting an interface body of the connecting element between the pair of clamp bodies; (ii) aligning a recessed area in each of the pair of clamp bodies with the interface body, the interface body including a first plurality of engaging elements along an outer perimeter thereof; (iii) engaging the interface body to the pair of clamp bodies and within the recessed area of each one of the pair of clamp bodies so that the interface body is at least partially sandwiched between the pair of clamp bodies and so that the first plurality of engaging elements engages an inner surface of at least one of the pair of clamp bodies; (iv) inserting a fastener through the pair of clamp bodies; and (v) tightening the fastener to compress the pair of clamp bodies against the connecting element.

BRIEF DESCRIPTION OF THE FIGURES

A more complete understanding of the method and apparatus of the present invention may be obtained by reference to the following Detailed Description when taken in conjunction with the accompanying figures wherein:

FIG. 1 is a front isometric view of an illustrative vehicular mounting system for an electronic device;

FIG. 2A is a rear isometric view of another illustrative vehicular mounting system for an electronic device;

FIG. 2B is a rear isometric view of yet another illustrative vehicular mounting system for an electronic device;

DETAILED DESCRIPTION

Figure 3A:
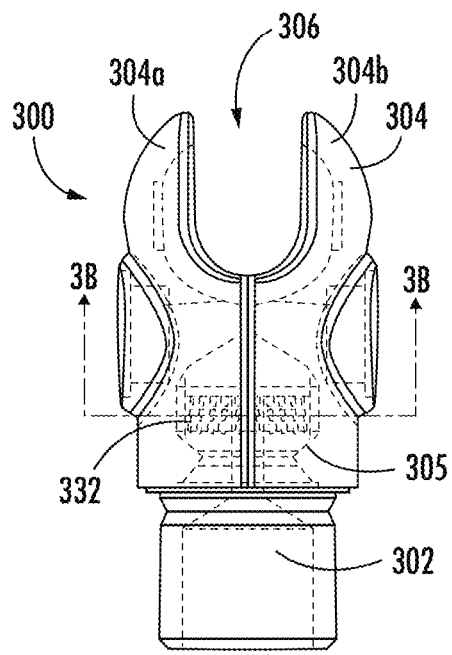
FIG. 3A is a front side view of an illustrative clamp assembly for a vehicular mounting system.

Before turning to the figures, which illustrate certain illustrative embodiments in detail, it should be understood that the present disclosure is not limited to the details or methodology set forth in the description or illustrated in the figures. It should also be understood that the terminology used herein is for the purpose of description only and should not be regarded as limiting.

OVERVIEW

Referring to FIG. 1, a vehicular mounting system 100 for supporting a mobile electronic device or mobile device (e.g., mobile phone, tablet, etc.) is shown. The vehicular mounting system 100 is configured to support the mobile device within a vehicle cab in a variety of different positions and/or orientations depending on the needs of the user. The vehicular mounting system 100 may also be configured to allow a user to readjust the position and/or orientation of the mobile device without removing the mounting system 100 from the vehicle. The vehicular mounting system 100 may be used in a wide variety of different applications and in different vehicle types. For example, the mounting system 100 may be used in a passenger vehicle (e.g., a car, a truck, etc.), or any other type of on-highway or off-highway vehicle application. The mounting system 100 may also be configured to be mounted within boats, airplanes, trains, or any other vehicle. The mounting system 100 may also be used in non-vehicle applications where an adjustable mounting solution is desired.

As shown in FIG. 1, the vehicular mounting system 100 includes a vehicle mount 102, a first clamp assembly 104, an elongated member 106, a second clamp assembly 108, and a device mount 109. The vehicle mount 102 (e.g., the mount, etc.) is configured to enable securing the mounting system 100 to a structural feature of a system in which the mounting system 100 is being transported while supporting the electronic device. For example, the vehicle mount 102 may be configured to couple the mounting system 100 to a vehicle body component, such as a dash, console, or another structural or non-structural element of the vehicle cab. Although shown as a rail with a slot, it should be understood that the vehicle mount 102 may have any other configuration to secure the mounting system 100 to a vehicle body component. The vehicle mount 102 may include a panel or adapter (not shown) that is shaped to match a profile of the vehicle body component and may include fastener(s) and/or an adhesive product to secure the vehicle mount 102 to the vehicle body component. In other embodiments, the vehicle mount 102 includes an adjustment element that allows a user to reposition portions of the mounting system 100 to different areas along the vehicle body component. For example, the vehicle mount 102 may include an elongated track or rail that extends along a length of the vehicle body component and allows the user to secure other portions of the vehicular mounting system 100 along the rail (e.g., to different longitudinal positions along the rail, etc.). In other embodiments, the vehicle mount 102 may be detachably coupled to the vehicle body component and may relocated to a different area along the vehicle body component based on the needs of the user without damaging the mounting surface or vehicle mount 102.

The first clamp assembly 104 is configured to couple the elongated member 106 to the vehicle mount 102 and includes an adjustment mechanism (e.g., a fastener, such as a wingnut or wing bolt) that is configured to allow the user to pivot or rotate the elongated member 106 with respect to the vehicle mount 102. The first clamp assembly 104 may include a ball mount 110 and a pair of clamp bodies 112a and 112b (collectively 112) that compress against the ball mount 110, under an applied force from the adjustment mechanism, to support the elongated member in position with respect to the ball mount 110. The adjustment mechanism may be tightened to increase the holding force between the clamp bodies 112 and the ball mount 110, and the frictional force preventing the clamp bodies 112 from sliding or otherwise moving relative to the ball mount 110.

The elongated member 106 is configured to space the device mount 109 holding the mobile device a distance away from the vehicle mount 102. The elongated member 106 may be a rigid shaft made from metal, plastic, fiberglass, carbon fiber, and/or any other material or composite material. The elongated member 106 may be configured to couple to the first and second clamp assemblies 104, 108 and to support the clamp assemblies 104, 108 in position relative to the vehicle mount 102. For example, the elongated member 106 may be a hollow tube defining a central cavity extending therethrough from a proximal end 114a to a distal end 114b (collectively 114) of the hollow tube. The first and second clamp assemblies 104, 108 may be insertable into the hollow tube such that at least a portion of the first and second clamp assemblies 104, 108 are disposed within the central cavity. The first and second clamp assemblies 104, 108 may be secured the hollow tube via a friction fit, using a fastener, and/or an adhesive product. In other embodiments, the first and second clamp assemblies 104, 108 may be secured directly to ends and/or around the perimeter of the proximal and/or distal ends 114 of the elongated member 106 (instead of being located at least partially within the elongated member 106).

The second clamp assembly 108 is configured to couple the elongated member 106 to the device mount 109. The second clamp assembly 108 may function similarly to the first clamp assembly 104 and may have a similar (e.g., identical) design as the first clamp assembly 104. In other embodiments, the designs of the first and second clamp assemblies 104, 108 may be different.

The device mount 109 is configured to retain a mobile device and support the mobile device in a desired position/orientation relative to the elongated member 106. The device mount 109 may have a variety of different forms. For example, FIG. 2A shows an embodiment of a device mount 218 that includes a mobile device holder 220 that is configured to detachably couple to a cover of a mobile device. For example, the mobile device holder 220 may include a magnet (not shown) that is configured to magnetically couple and retain a metal plate or other ferrous material within a cover of the mobile device.

FIG. 2B shows another embodiment of a mobile device holder 222 for a vehicular mounting system. The mobile device holder 222 includes an adjustable clamping device 223 that supports a mobile device 225 in compression by using a spring or other mechanism. The mobile device holder 222 also includes a ball mount 224 that extends away from the adjustable clamping device 223. The second clamp assembly 208 is configured to couple to the mobile device holder 222 at the ball mount 224 and to allow adjustment of a position and/or orientation of the mobile device 225 through rotation of the ball mount 224 relative to the second clamp assembly 208.

For example, a user may adjust (e.g., unscrew) an adjustment mechanism 226 (e.g., a fastener, such as a wingnut or wing bolt) to reduce a compressive force applied by the second clamp assembly 208 to the ball mount 224 (e.g., to reduce compression on a spherical connecting element of the ball mount 224). Unscrewing the adjustment mechanism 226 may also reduce the compressive force applied by the second clamp assembly 208 to a connecting element holding the second clamp assembly 208 onto the elongated member 204, so that the user can rotate portions of the second clamp assembly 208 with respect to the elongated member 204 (e.g., about a central axis of the elongated member 204) in addition to pivoting or otherwise repositioning the ball mount 224 within the second clamp assembly 208. The user may then re-adjust the second clamp assembly 208 (e.g., tighten the adjustment mechanism 226) to secure the adjustable clamping device 223 and mobile device 225 in position relative to the vehicle component.

It should be appreciated that the vehicular mounting system 100 and components shown and described with respect to FIGS. 1, 2A, and 2B are provided for illustrative purposes only. In other embodiments, the mounting system 100 may include additional, fewer, and/or different components.

During vehicle operation, and depending on the application, the vehicular mounting system (e.g., mounting system 100) may be exposed to high levels of vibration and/or rotational forces. The clamp assemblies of the mounting system support the mobile device in position and prevent "self-adjustment" of the mounting system (e.g., the first clamp assembly and/or the second clamp assembly) under the weight of the mobile device and rotational forces applied therefrom. One way to improve the holding force provided by the first and second clamp assemblies is to increase the clamping force applied by the clamp assemblies to their respective ball mounts. However, additional mechanisms for increasing loading capacity and resistance to vibration and rotational loads are undesirable so as to avoid added complexity, production time, assembly time, and cost.

Connecting Element for a Vehicular Mounting System

FIGS. 3A-3D show various views of a clamp assembly 300 of a vehicular mounting system that is configured to provide improved stability under rotational and/or vibrational loads. The clamp assembly 300 is configured to allow rotation of the clamp assembly 300 about a central axis of the clamp assembly 300 with respect to an elongated member or other support element. The clamp assembly 300 is also configured to couple to a ball mount or other pivoting member and to allow for readjustment of the positioning of the ball mount within the clamp assembly 300.

The clamp assembly 300 may include a connecting element 302 and a pair of opposing clamp bodies 304. The pair of clamp bodies 304a and 304b (collectively 304) are configured to be positioned on opposing sides of the connecting element 302, such that the connecting element 302 is sandwiched or otherwise disposed and retained between the clamp bodies 304. The clamp bodies 304 may also include an opening 306, spaced apart from the connecting element 302 and sized to receive a ball mount therein. The clamp bodies 304 are configured to press radially against the connecting element 302 and ball mount during operation to prevent rotation of the clamp bodies 304 relative to the connecting element 302 and/or ball mount. As shown in FIG. 3D, the clamp bodies 304 also include a through-hole opening 308, disposed axially between the connecting element 302 and the opening 306 and extending laterally through the clamp bodies 304. The through-hole opening 308 may be configured to receive a fastener or other adjustment mechanism therein to allow for adjustment of the compressive force applied to the connecting element 302 and ball mount by the clamp bodies 304.

The connecting element 302 is configured to couple the clamp assembly 300 to an elongated member (e.g., a shaft, a hollow tube, etc.) and to prevent axial movement of the clamp bodies 304 relative to the connecting element 302. While the connecting element 302 is shown and described herein as being engaged with the elongated member, it should be understood that the connecting element 302 may also be used in other mounting system configurations that do not include an elongated member or that include additional connecting elements that are used independently from the elongated member. For example, connecting element 302 may be engaged with and/or secured directly to another type of mount (e.g., the vehicle mount 102 of FIG. 1), such as to a panel that is coupled to a vehicle dashboard or another structural feature of a system (e.g., airplane, truck, train, boat, etc.) in which the mounting system is being transported. The connecting element 302 is also configured to improve the strength of the compressive joint between the clamp bodies 304 and the connecting element 302 under rotational loading. As is further illustrated in FIG. 5, the connecting element 302 may include a taper and the clamp bodies 304 may have corresponding tapers in a region that interfaces with the connecting element 302.

Figure 3B:
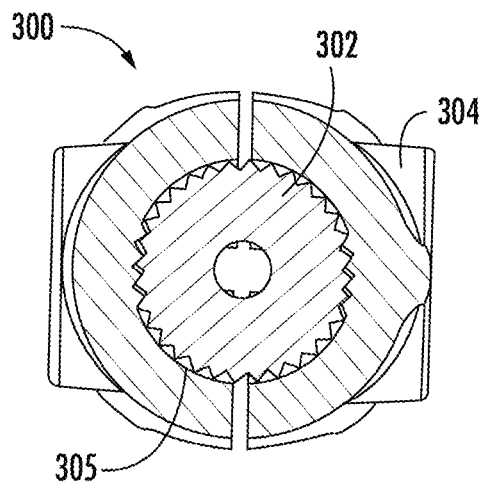
FIG. 3B is a top cross-sectional view of the clamp assembly of FIG. 3A.
Figure 3C:
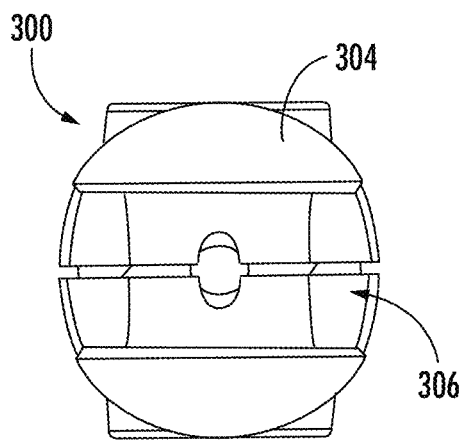
FIG. 3C is a top view of the clamp assembly of FIG. 3A.
Figure 3D:
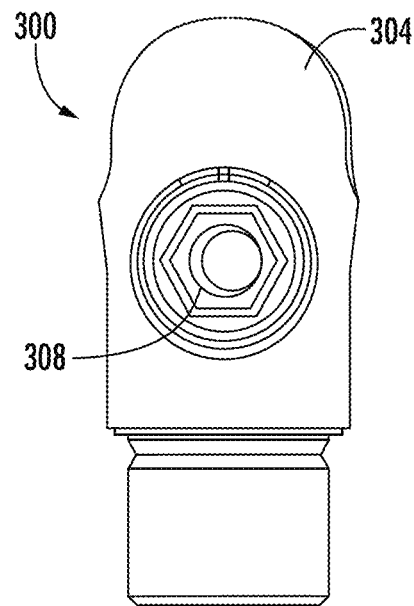
FIG. 3D is a left side view of the clamp assembly of FIG. 3A.

In at least one embodiment, as shown in FIG. 3B, the connecting element 302 includes a plurality of interface features or engaging elements 332 (e.g., teeth) that are configured to engage with at least one of the clamp bodies 304. The engaging elements 332 are designed and positioned to increase strength under rotational loading without reducing the clamping force that is applied to a ball mount.

Figure 4A:
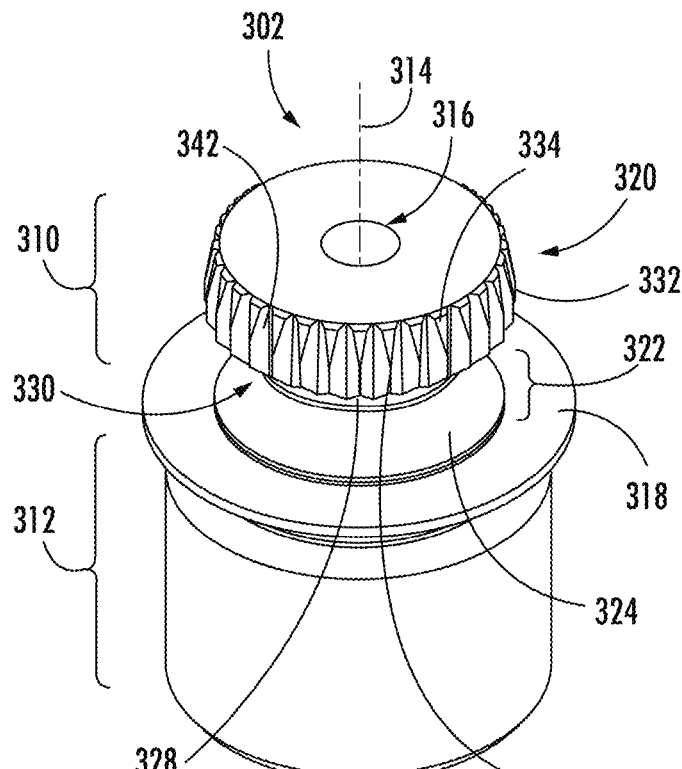
FIG. 4A is an isometric view of an illustrative connecting element of the clamp assembly of FIG. 3A.

FIG. 4A shows and isometric view of the connecting element 302 of the clamp assembly 300. The connecting element 302 may include an elongated body, rod, shaft, etc. having a first end (e.g., a first plug end 303) and a second end e.g., a second plug end 305 opposite the first end. The connecting element 302 may include an interface body 310 (e.g., a first body portion, etc.) and a base, shown as plug 312 (e.g., a second body portion, etc.). The interface body 310 may be disposed on an axial end of the base, such as at a first plug 312 end of the plug 312 and may extend axially away from the plug 312. The interface body 310 may be arranged coaxially with the plug 312 such that the interface body 310 and the plug 312 share a common central axis 314.

In an embodiment, the plug 312 is configured to couple the connecting element 302 to an elongated member (e.g., elongated member 204 of FIG. 2B). The plug 312 may be formed as a cylindrical shaft that is configured to be inserted into a central cavity of a hollow tube. An outer diameter of the plug 312 may be sized to provide a friction or interference fit with the elongated member. In other embodiments, the plug 312 may include interface elements (e.g., ribs, etc.) to facilitate coupling between the plug 312 and the elongated member. In yet other embodiments, the plug 312 may include holes or other openings configured to enable fastening the plug 312 to the elongated member.

In some embodiments, the connecting element 302 includes a through-hole opening 316 extending axially therethrough. The through-hole opening 316 may pass centrally through the connecting element 302 along the central axis 314 so as to allow the passage of air through the connecting element 302 and into the elongated member, which can facilitate removal of water or other fluids that may become trapped in the elongated member or possibly function as a securing feature. In other embodiments, the connecting element 302 may have a solid core. The connecting element 302 may be cast, machined, or otherwise formed from a single piece of material.

Figure 4B:
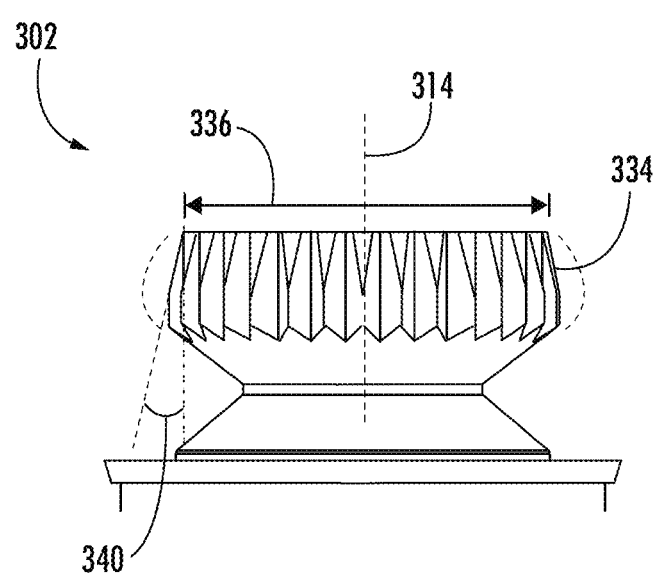
FIG. 4B is a front side view of the illustrative connecting element of FIG. 4A.

As shown in FIG. 4B, the connecting element 302 may include a circumferential flange 318 that is configured to engage or otherwise support the connecting element 302 in position with respect to the elongated member (e.g., to prevent over-insertion of the connecting element 302 into the elongated member, etc.). In other embodiments, the connecting element 302 may not include a circumferential flange. For example, the connecting element 302 may be configured to threadably engage the elongated member. In other embodiments, the system may include a set screw (e.g., set screw) or another fastening feature to enable securing the connecting element 302 to the elongated member or another type of mount. In some embodiments, the connecting element 302 may be configured to engage with a recessed area within the elongated member of another type of mount that limits the insertion distance of the connecting element 302. The circumferential flange 318 may be disposed between the plug 312 and the interface body 310. The circumferential flange 318 extends radially away from the interface body 310 and the plug 312. In an embodiment, the circumferential flange 318 extends in a circumferential direction along a portion of an outer perimeter of the connecting element 302. In other embodiments, the circumferential flange 318 extends along an entire outer perimeter of the connecting element 302.

The interface body 310 is configured to engage a pair of clamp bodies and to substantially prevent both axial and rotational movement of the clamp bodies relative to the connecting element 302 when the clamp bodies are compressed against the connecting element 302. In an embodiment, the interface body 310 extends axially away from the circumferential flange 318. The interface body 310 may include a first body portion 320 and a second body portion 322 that extends axially between the circumferential flange 318 and the first body portion 320, such that the first body portion 320 is located at a distal end of the second body portion 322.

The second body portion 322 is configured to engage with a recessed area in the pair of clamp bodies to prevent axial movement of the clamp bodies relative to the connecting element 302. In some embodiments, the second body portion 322 has a reduced diameter relative to the first body portion 320 such that the second body portion 322 forms a channel, groove, and/or notch between the first body portion 320 and the circumferential flange 318. For example, the second body portion 322 may include a first tapered surface 324 extending axially away from the circumferential flange 318. An outer diameter of the first tapered surface 324 may decrease continuously or semi-continuously (e.g., breaks or shelves) with increasing distance away from the circumferential flange 318. The second body portion 322 may also include a second tapered surface 328 extending between the first tapered surface 324 and the first body portion 320. An outer diameter of the second tapered surface 328 may increase continuously or semi-continuously with increasing distance away from the circumferential flange 318 such that the first tapered surface 324 and the second tapered surface 328 together form a channel 330 (e.g., groove, notch, valley, etc.) between the circumferential flange 318 and the first body portion 320.

As shown in FIG. 3A, the clamp bodies 304 may include a recessed area 305 that is shaped reciprocal to a profile of the second body portion 322. Engagement between the recessed area 305 and the second body portion 322 may substantially prevent axial movement of the clamp bodies 304 when fastened or otherwise pressed against the interface body 310. The channel 330 may have a "V"-shaped or "U"-shaped profile in cross-section or any other profile. In other embodiments, the second body portion 322 may include a rectangular notch instead of tapered surfaces. In yet other embodiments, the second body portion 322 may include a repeating profile, such as a sawtooth profile or another waveform profile extending in a repeating pattern along an axial direction.

The first body portion 320 is configured to engage an inner surface of the clamp bodies, such as clamp bodies 304 of FIG. 3A, under a compressive force applied by the clamp bodies to the connecting element 302. The first body portion 320 is also configured to allow for relative angular rotation between the clamp bodies during assembly so as to allow adjustment of an amount of compression applied to the ball mount, as will be further described.

As shown in FIG. 4A, the interface body 310 also includes a plurality of engaging elements 332 that are configured to (i) allow for rotational movement or clocking of the clamp bodies to different rotational positions about the central axis 314 when the clamp bodies are pulled away from the connecting element 302, and (ii) to substantially prevent rotation of the clamp bodies about the central axis 314 when compressed against the connecting element 302. The plurality of engaging elements 332 may be disposed on the first body portion 320 and/or the second body portion 322 of the interface body 310. The plurality of engaging elements 332 may extend along an outer perimeter of the first body portion 320 and/or the second body portion 322.

In at least one embodiment, the plurality of engaging elements 332 are disposed on the first body portion 320. Together, the plurality of engaging elements 332 and the first body portion 320 may be configured to allow for angular rotation of the clamp bodies toward one another under compressive loading (e.g., under a radially compressive force applied to the pair of clamp bodies). For example, the plurality of engaging elements 332 may be disposed along an at least partially radially-outward facing surface 334 of the first body portion 320. As shown in FIG. 4B, the radially-outward facing surface 334 may be a tapered surface that narrows toward one axial end of the interface body 310. In other embodiments, at least part of the radially-outward facing surface 334 may curve when viewed along a reference plane orientated parallel to the central axis 314 of the connecting element 302. For example, the radially-outward facing surface 334 may have a half-moon shape or any other geometric shape.

In an embodiment, an outer diameter 336 of the at least partially radially-outward facing surface 334 decreases with increasing distance from the second body portion 322 (e.g., decreases approaching a distal end of the interface body 310, etc.). Such an arrangement of the radially-outward facing surface 334 provides freedom-of-angular rotation of the clamp bodies relative to the interface body 310 (e.g., about a reference axis that is oriented normal to the central axis 314).

Figure 5:
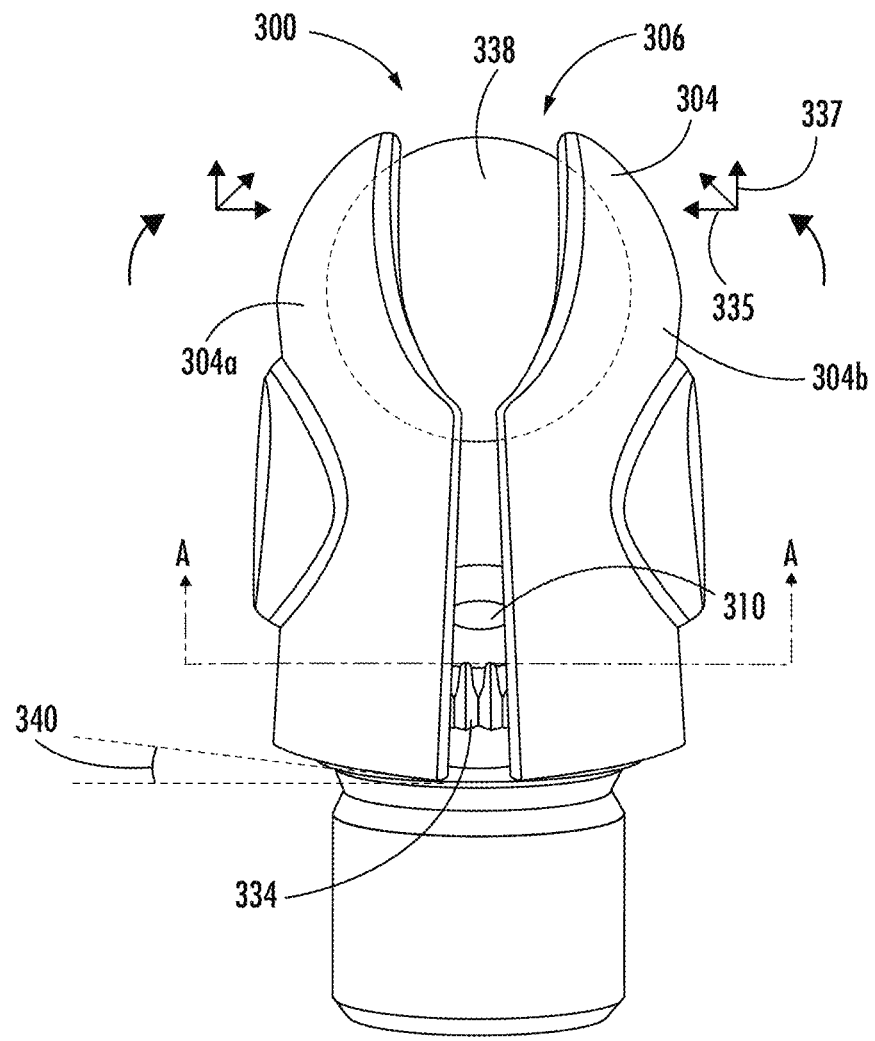
FIG. 5 is an isometric view of the clamp assembly of FIG. 3A security to a ball mount.

For example, FIG. 5 shows an assembly operation used to secure the clamp assembly 300 to a ball mount 338. The opposing pair of clamp bodies 304 are positioned on opposing sides of the interface body 310 such that the interface body 310 is sandwiched or otherwise disposed between the pair of clamp bodies 304. At least one clamp body of the pair of clamp bodies 304 is sized so that a gap exists between the pair of clamp bodies 304, thereby providing clearance for the clamp bodies 304 to move toward one another during assembly and to reduce the size of the opening 306 or open volume defined between free or distal ends of the clamp bodies 304 and within which the ball mount 338 is positioned.

As shown, during assembly, the ball mount 338 (e.g., a spherical connecting element, etc.) is positioned between the clamp bodies 304 within the opening 306. The user may adjust an adjustment element to draw the clamp bodies 304 toward one another and into compression against the ball mount 338. For example, the user may thread a fastener into the clamp bodies to move the clamp bodies 304 toward one another. The clamp bodies 304 are configured to engage with the at least partially radially-outward facing surface 334 so as to allow the pair of clamp bodies 304 to angle inward towards one another under a radially compressive force applied to the pair of clamp bodies 304. The taper on the radially-outward facing surface 334 accommodates the angular rotation of each clamp body up to an angle that is approximately equal to a surface angle 340 formed between the radially-outward facing surface 334 and a reference plane extending through an upper edge of the radially-outward facing surface 334 and oriented substantially parallel to the central axis 314 (see also FIG. 4B). The surface angle 340 may be within a range between approximately 5 degrees and 45 degrees, approximately 5 degrees and 20 degrees, approximately 5 degrees and 15 degrees, inclusive, or another angle between approximately 5 degrees and 15 degrees. Angular rotation of the clamp bodies 304 may produce both a radial force 335 and an axial force 337 between the clamp bodies 304 and the ball mount 338. The compressive force prevents movement of the ball mount 338 relative to the clamp bodies 304.

In an embodiment, as shown in FIG. 4A and FIG. 4B, the plurality of engaging elements 332 is disposed on the radially-outward facing surface 334 and extends in a repeating pattern along an entire outer perimeter of the radially-outward facing surface 334. In other embodiments, the plurality of engaging elements 332 is disposed along one or more portions of the outer perimeter of the first body portion 320. The plurality of engaging elements 332 may be formed by a splined surface or shaft that includes radial projections along the radially-outward facing surface 334 that extend radially away from the radially-outward facing surface 334. For example, the plurality of engaging elements 332 may be defined by a plurality of axially extending grooves 342 in the radially-outward facing surface 334 to form a plurality of teeth 344 or ridges in the first body portion 320.

The plurality of engaging elements 332 may be formed as a sawtooth profile or shape in the radially-outward facing surface 334, or another geometric shape. In other embodiments, the plurality of engaging elements 332 may be formed as a triangular waveform, a sinusoidal waveform, a square waveform, a rectangular waveform, a trapezoidal waveform, or any other geometric waveform shape. In other embodiments, at least some of the radial projections may be angled with respect to an axial direction (e.g., at an angle of approximately 10 degrees, 30 degrees, 40 degrees, 45 degrees, or at any other angle within a range between and including 10 degrees to 45 degrees, etc.).

In yet other embodiments, the first body portion 320 at the radially-outward facing surface 334 may include a shaft in the shape of a regular prism having at least six sides in which each side of the shaft defines a respective one of the first plurality of engaging elements (e.g., in which the radially-outward facing surface 334, when viewed in cross-section is in the shape of a hexagon, heptagon, octagon, nonagon, decagon, or includes any other number of surfaces that each define a respective one of the plurality of engaging elements 332). In yet other embodiments, the plurality of engaging elements 332 may comprise another undulating surface profile or shape having a plurality of grooves interposed between radial projections from the first body portion 320. Positioning the engaging elements 332 on the radially-outward facing surface 334 allows for freedom-of-angular rotation of the clamp bodies 304 while at the same time securing the rotational position of the clamp bodies 304 about the central axis 314.

The design of the plurality of engaging elements 332 shown in FIG. 4A and FIG. 4B is provided for illustrative purposes only. It should be appreciated that the size, position, and arrangement of engaging elements 332 may be different in other embodiments. For example, the plurality of engaging elements 332 may be disposed along the second body portion 322 as an alternative to, or in combination with, positioning engaging elements 332 on the first body portion 320. For instance, the plurality of engaging elements 332 may be disposed axially between the first tapered surface 324 and the second tapered surface 328 of the second body portion 322, and/or may be at least partially formed by the first tapered surface 324 or the second tapered surface 328.

The plurality of engaging elements 332 is configured to press against an inner surface of at least one of the clamp bodies 304 under a radially compressive force applied to the pair of clamp bodies 304 so as to substantially prevent rotation of the clamp bodies 304 with respect to the connecting element 302. The engaging elements 332 can increase the resistance to rotation under torsional loading by a factor of at least about 6.5 to about 7 relative to smooth surface interface between the engaging elements and the clamp bodies under certain conditions. Higher or lower levels of resistance are possible.

In some embodiments, the pair of clamp bodies 304 also include engaging elements that are configured to engage with the first or second body portion. For example, referring to FIGS. 6A and 6B, an illustrative clamp body 400 is shown that is configured to couple a connecting element to a ball mount assembly or device. The clamp body 400 may be molded or otherwise formed from a single piece of material as a unitary and monolithic piece. In an embodiment, the material of the clamp body is softer than the material of the connecting element such that the plurality of engaging elements in the connecting element may penetrate into or slightly deform the clamp body 400 thereby providing for rotational resistance.

Figure 6A:
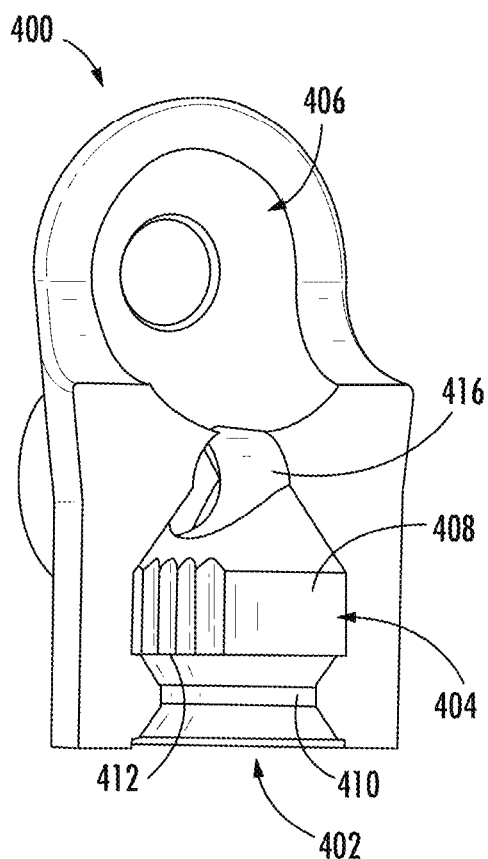
FIG. 6A is a front isometric view of a clamp body of the clamp assembly of FIG. 3A.
Figure 6B:
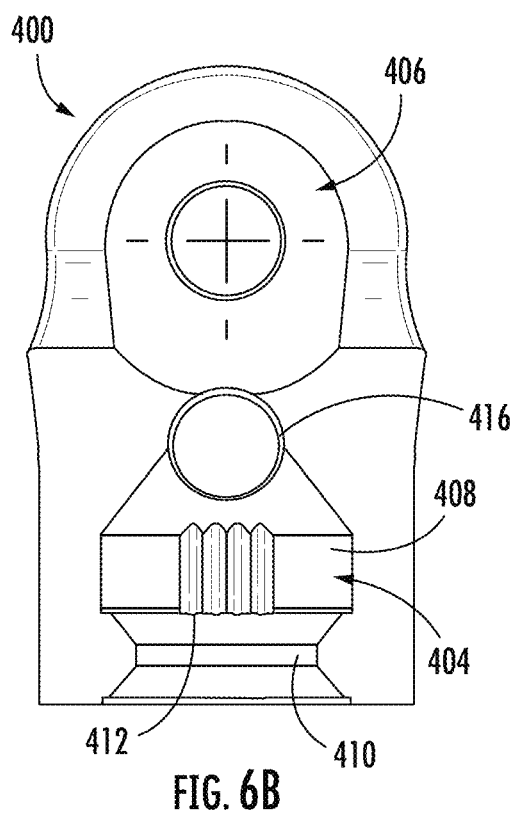
FIG. 6B is a front side view of the clamp body of FIG. 6A.

As shown in FIGS. 6A and 6B, the clamp body 400 defines a recessed area 402 having two portions, shown as first recessed area 404 and second recessed area 406. The first recessed area 404 may be contiguous with the second recessed area 406 or may be spaced apart from the second recessed area 406 by other portions of the clamp body 400. For example, the first recessed area 404 may be spaced apart from the second recessed area 406 by a through-hole opening 416. The through-hole opening 416 may be configured to receive an adjustment element (e.g., a bolt or other fastener) therein to facilitate assembly of the clamp body 400 to the connecting element (e.g., connecting element 302 of FIG. 3A). In an embodiment, the first recessed area 404 is configured to receive a portion of the connecting element therein. The second recessed area 406 is configured to engage a ball mount device or assembly such as a spherical connecting element of a ball mount, as will be further described.

The first recessed area 404 may be shaped complementary or reciprocal to a shape of an interface body of the connecting element so as to nestably receive the connecting element therein so as to substantially prevent movement of the clamp body 400 when pressed against the connecting element. In an embodiment, the first recessed area 404 includes a first interface portion 408 that is shaped reciprocal to a first body portion of the connecting element, and a second interface portion 410 that is shaped reciprocal to the second body portion of the connecting element.

The first interface portion 408 and the second interface portion 410 may include inner surfaces that are smooth and without surface indentation along the length of the inner surfaces. In at least one embodiment, as shown in FIG. 6A and FIG. 6B, the clamp body 400 includes a second plurality of engaging elements 412 that is configured to engage with a first plurality of engaging elements of the interface body. For example, the clamp body 400 may include a second plurality of engaging elements 412 defined by an inner surface of at least one of the first interface portion 408 or the second interface portion 410. The second plurality of engaging elements 412 may have an inward profile that is reciprocal to the first plurality of engaging elements of the interface body such that the second plurality of engaging elements are configured to nestably engage with the first plurality of engaging elements in at least one rotational position (e.g., or a plurality of rotational positions about a central axis of the interface body). Together, the first plurality of engaging elements and the second plurality of engaging elements 412 may significantly increase the rotational stability of the clamp assembly. The inclusion of the engaging elements 412 may increase rotational resistance by a factor of about 20 or more.

Ball Mount Assembly for a Vehicular Mounting System

Figure 7:
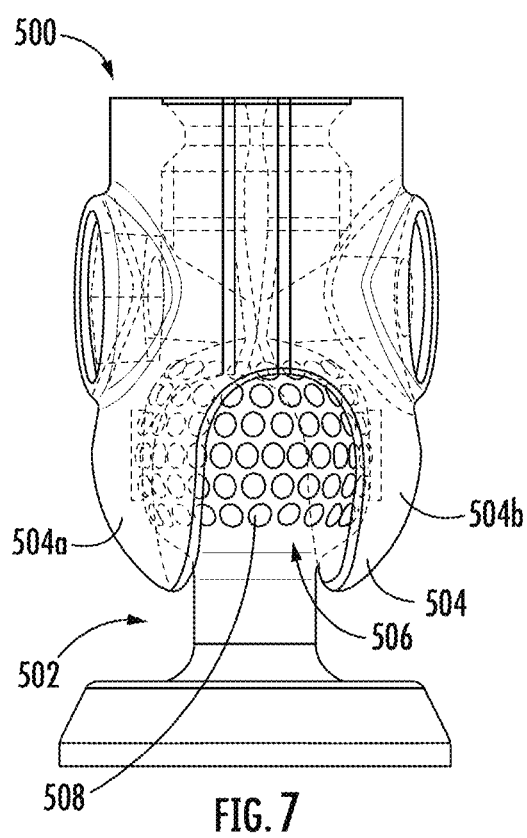
FIG. 7 is a front side view of another illustrative clamp assembly for a vehicular mounting system.

Referring to FIG. 7, a clamp assembly 500 is shown that includes engaging features on a ball mount 502 of the clamp assembly 500. The clamp assembly 500 includes a pair of opposing clamp bodies 504a, 504b (collectively 504) that are arranged on opposite sides of the ball mount 502 and that press against the ball mount 502 under an applied force from an adjustment element (e.g., a fastener, such as a bolt, wingnut, etc.) to substantially prevent movement of the ball mount 502 relative to the clamp bodies 504. The ball mount 502 includes a spherical connecting element 506 (e.g., a ball adapter, a pivot element, etc.) that includes a plurality of engaging elements 508. The plurality of engaging elements 508 are configured to engage with an inner surface of at least one of the pair of clamp bodies 504 to increase the strength of the joint between the ball mount 502 and the pair of clamp bodies 504 and resistance to movement under rotational and/or vibrational loads.

Figure 8:
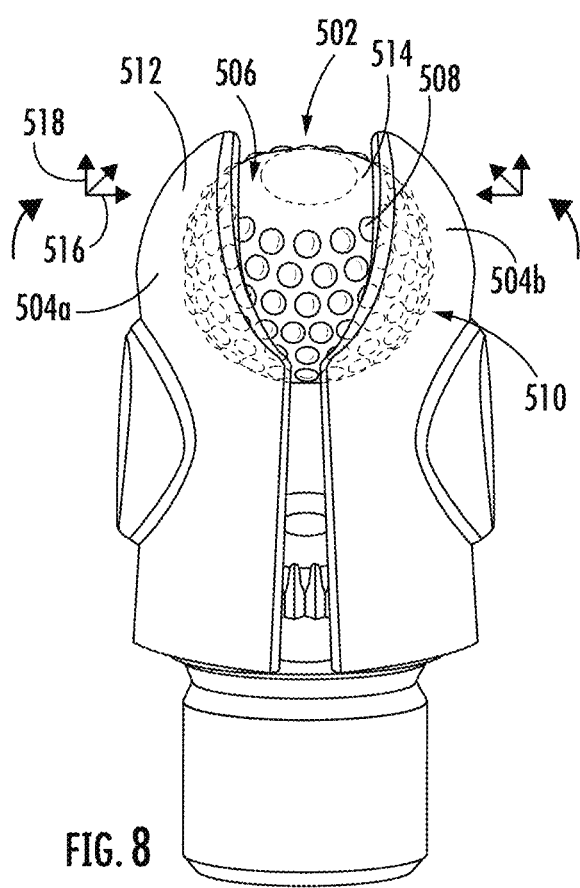
FIG. 8 is an isometric view of the clamp assembly of FIG. 7 secured to a ball mount.

As shown in FIG. 8, during assembly, the spherical connecting element 506 is positioned between the pair of clamp bodies 504 within an opening 510 that is defined by the pair of clamp bodies 504. A distal end of each of the clamp bodies 504 may form an axial extension 512 (e.g., tab, a protrusion, etc.). The opening 510 may be at least partially formed or defined by a space or gap between the axial extensions 512. A user may reposition or otherwise adjust the adjustment element to draw the clamp bodies 504 toward one another and into compression against the ball mount 502. During assembly, the clamp bodies 504 may rotate or pivot relative to the connecting element such that a distal end of each of the clamp bodies moves toward one another and into engagement with an outer surface 514 (e.g., outwardly facing surface, etc.) of the spherical connecting element 506. The angular rotation of the pair of clamp bodies 504 applies compression to the spherical connecting element 506 and between the engaging elements 508 and the inner surface(s) of the pair of clamp bodies 504. Angular rotation of the clamp bodies 504, combined with radial movement of the clamp bodies 504 toward one another, may produce both a radial force 516 and an axial force 518 between the clamp bodies 504 and the ball mount 502.

The engaging elements 508 may be arranged so that a user can reposition the spherical connecting element 506 within the clamp bodies 504 to any desired rotational position without sacrificing the holding force between the spherical connecting element 506 and the clamp bodies 504 once assembled. The inner surface(s) of the clamp bodies 504 may press against the engaging elements 508, and may deform radially inward (e.g., toward the spherical connecting element 506) or radially outward (e.g., away from the spherical connecting element 506) at a plurality of positions along the inner surface(s) depending on the size, shape, and arrangement of the plurality of engaging elements 508 and the materials used for the spherical connecting element 506 and the pair of clamp bodies 504.

Figure 9:
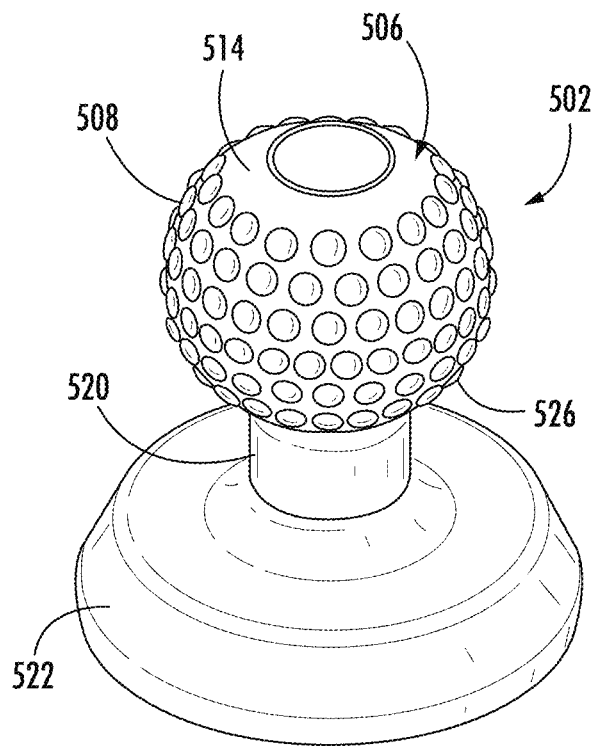
FIG. 9 is an isometric view of an illustrative ball mount assembly of the clamp assembly of FIG. 7.

As shown in FIG. 9, the ball mount 502 may be a ball mount assembly that includes the spherical connecting element 506, a pedestal 520, and a base 522. The pedestal 520 and the base 522 are configured to couple the spherical connecting element 506 to a mobile device holder or another mount (e.g., such as the vehicle mount 102 of FIG. 1, etc.).

The engaging elements 508 are disposed along an outer surface 514 of the spherical connecting element 506 (e.g., a spherically-shaped outer surface, a radially-outward facing surface, etc.). The engaging elements 508 may be disposed along the entire outer surface 524 or along only portions thereof. The engaging elements 508 may be arranged in a repeating pattern along the outer surface 514. The engaging elements 508 may be disposed along the outer surface 514 in an array with approximately uniform spacing between adjacent ones of the engaging elements 508. Positioning the engaging elements 508 in a uniform array or pattern along the entire outer surface 524 can ensure a more uniform holding force between the spherical connecting element 506 and the clamp bodies regardless of the rotational position of the spherical connecting element 506. In other embodiments, the engaging elements 508 may be randomly or semi-randomly spaced along the outer surface 514.

In at least one embodiment, the engaging elements 508 are protrusions 526 that extend radially away from the outer surface 514. For example, the engaging elements 508 may be formed from a convex surface structure, which may include a plurality of spherical elements or protrusions that extend away from the outer surface 514. In other embodiments, the engaging elements 508 may be triangular protrusions, vertically or non-vertically oriented splines, or convex elements of any other geometric shape. For instance, the spherical connecting element 506 may include or be formed as a geodesic polyhedron with surfaces divided into isosceles triangles or another geometric shape. The engaging elements 508 may taper to a point or region of reduced diameter, which can provide a greater resistance to rotation between the spherical connecting element 506 and the clamp bodies 504. In an embodiment, a first dimension (e.g., a first outer diameter) of the engaging elements 508 proximate to the outer surface 514 is greater than a second dimension (e.g., a second outer diameter) of the engaging elements 508 spaced a distance apart from the outer surface 514. The protrusions 526 may be configured to engage with a material on an inside wall of the clamp bodies 504 that is harder than the material of the spherical connecting element 506, and may bite into or otherwise deform the harder material in the clamp bodies 504 to increase resistance to relative movement between the spherical connecting element 506 and the clamp bodies 504. In other embodiments, the protrusions 526 may be configured to engage with a material on an inside wall of the clamp bodies 504 that is softer than the material of the spherical connecting element 506.

It should be appreciated that the shape, size, and arrangement of engaging elements 508 may be different in other embodiments. For example, in some embodiments the engaging elements 506 may be formed as a concave surface structure, which may include a plurality of indentations (e.g., dimples, etc.) along the outer surface 514 instead of, or in addition to, convex elements. The concave elements may defined recessed areas along the outer surface 514 and may be formed in any desired shape, including—but not limited to—spherical indentations, triangular indentations, vertically or non-vertically oriented grooves, or another concave element. The concave elements may taper to reduced diameter or may have an approximately uniform cross-sectional area along the radial direction (e.g., the concave elements may be cylindrical cuts that extend radially into the spherical connecting element 506). The concave elements may be configured to engage with a softer material on an inside surface of the clamp bodies 504, which may deform into the recessed areas to increase resistance to relative movement between the spherical connecting element 506 and the clamp bodies 504. For example, the spherical connecting element 506 may be cast or otherwise formed from hard plastic and the clamp bodies 504 may include a softer plastic material, such as a thermoplastic elastomer, rubber, silicon ring, or coating that can deform into the recessed areas. In yet other embodiments, the engaging elements 508 may be formed from another type of surface ornamentation or texture.

The spherical connecting element 506 is disposed at a distal end of the pedestal 520 at an opposite axial end of the pedestal 520 as the base 522. The spherical connecting element 506 is spaced apart from the base 522 by the pedestal 520. The pedestal 520 may be disposed at a central position along the base or at any other location depending on the application. In an embodiment, the base 522 is configured to mount to, or otherwise form, a mobile device holder and/or vehicle mount.

Figure 10A:
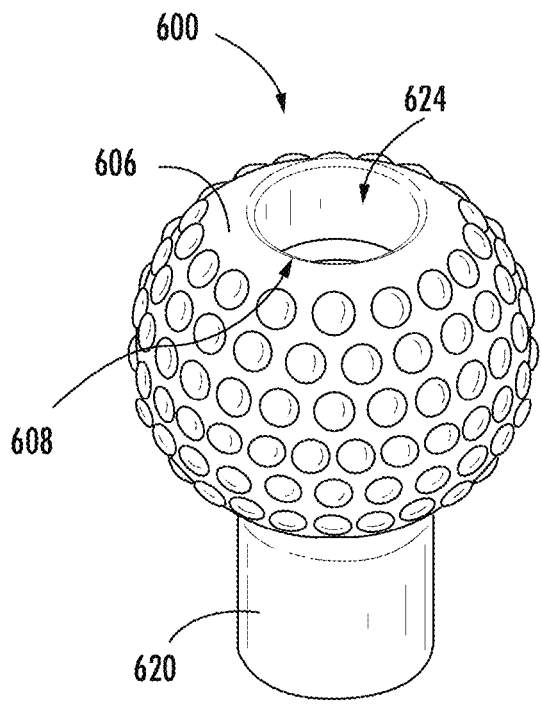
FIG. 10A is an isometric view of an illustrative ball mount of the ball mount assembly of FIG. 9.
Figure 10B:
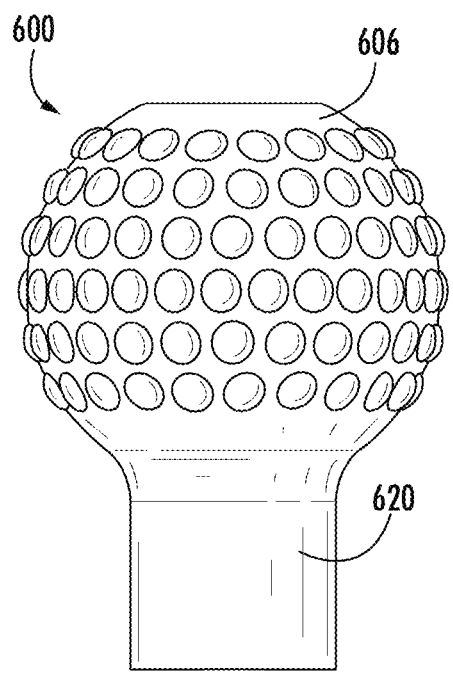
FIG. 10B is a front side view of the ball mount of FIG. 10A.
Figure 10C:
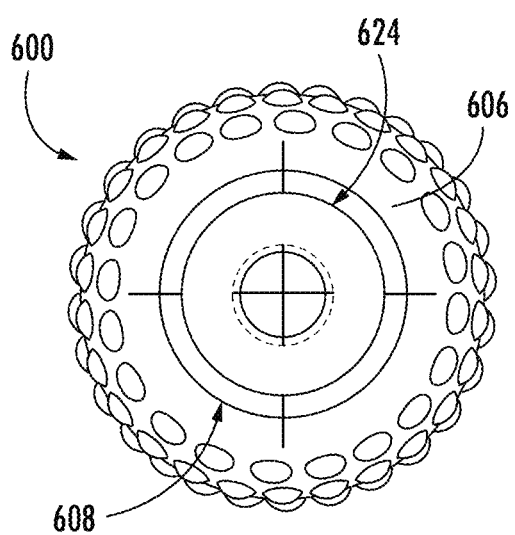
FIG. 10C is a top view of the ball mount of FIG. 10A.
Figure 11:
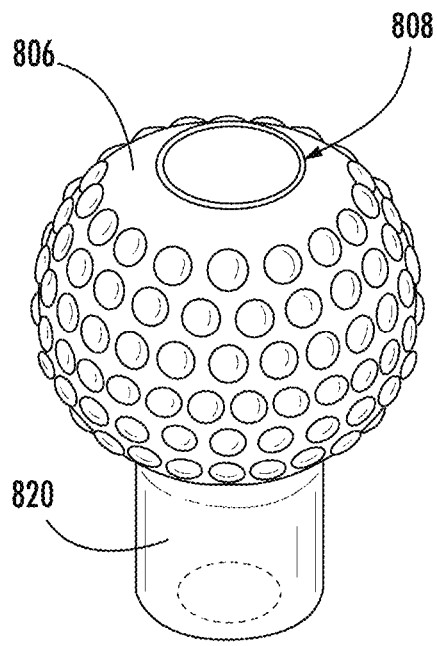
FIG. 11 is an isometric view of another illustrative ball mount.

In some embodiments, the spherical connecting element 506, a pedestal 520, and a base 522 may be integrally formed from a single piece of material as a unitary or monolithic piece. In other embodiments, at least one of the spherical connecting element 506, a pedestal 520, and a base 522 may be separately formed and may be joined together. For example, FIGS. 10A-10B show an illustrative ball mount 600 that includes a spherical connecting element 606 that is integrally formed with a pedestal 620 as a separate piece from a base. The ball mount 600 includes a through-hole opening 608 extending axially through the spherical connecting element 606 and the pedestal 620 and arranged collinear with a central axis of the ball mount 600. The through-hole opening 608 may be configured to receive a bolt, screw, or other fastener to couple the spherical connecting element 606 and the pedestal 620 to the base. The through-hole opening 608 may include a counter bore 624 in a distal end of the spherical connecting element 606 to receive a head of a fastener therein so that the fastener is substantially flush with an outer surface of the spherical connecting element 606. In other embodiments, as shown in FIG. 11, the through-hole opening 808 may have an approximately uniform cross-section through the spherical connecting element 806 and the pedestal 820.

Figure 12A:
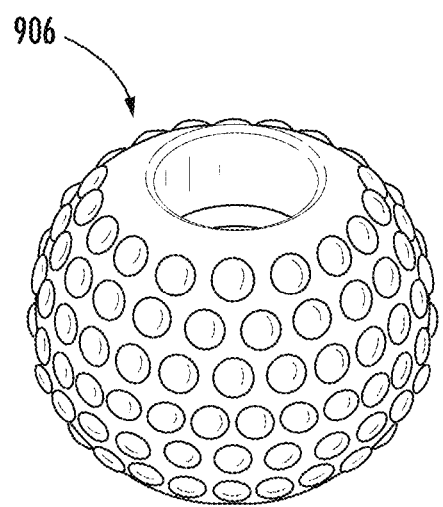
FIG. 12A is an isometric view of a spherical connecting element of a ball mount assembly.
Figure 12B:
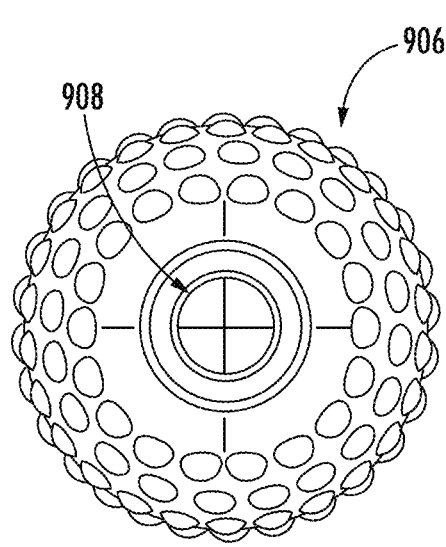
FIG. 12B is a top view of the spherical connecting element of FIG. 12A.
Figure 12C:
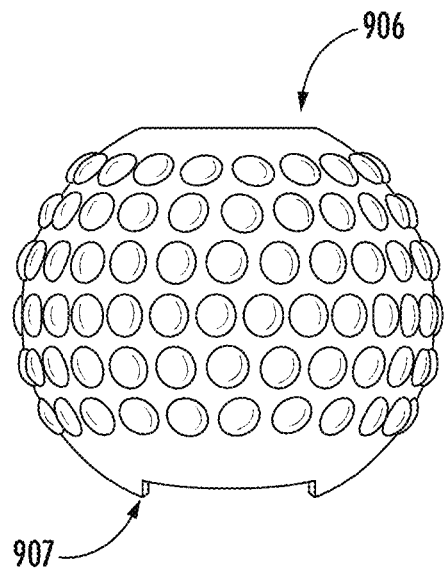
FIG. 12C is a front side view of the spherical connecting element of FIG. 12A.
Figure 13A:
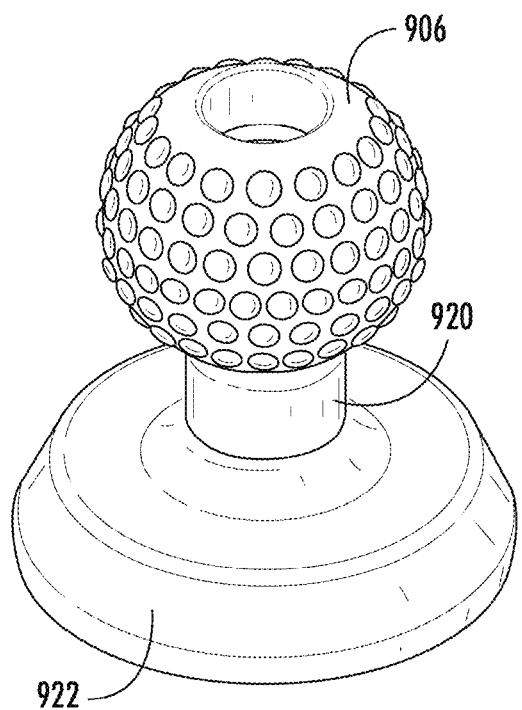
FIG. 13A is an isometric view of another illustrative ball mount assembly.
Figure 13B:
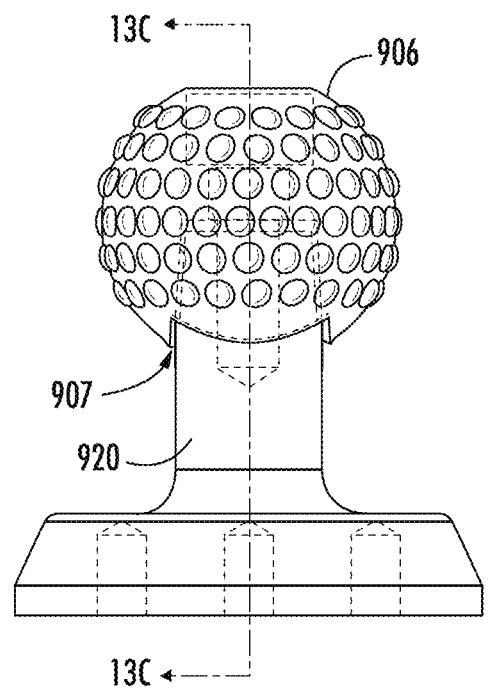
FIG. 13B is a side view of the ball mount assembly of FIG. 13A.
Figure 13C:
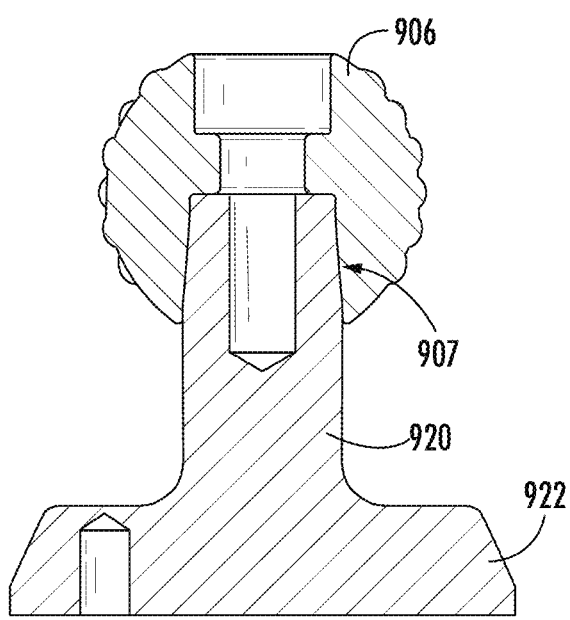
FIG. 13C is a side cross-sectional view of the ball mount assembly of FIG. 13A.

In yet other embodiments, as shown in FIGS. 12A-12C, the spherical connecting element 906 may be formed separately from a pedestal and a base of a ball mount. The spherical connecting element 906 may include a recessed area 907 on at least one end of a through-hole opening 908, which may have a circular or non-circular shape to match a cross-sectional geometry of the pedestal. As shown in FIGS. 13A-13C, the recessed area 907 may be configured to nestably receive the pedestal 920 therein and may be configured to facilitate fastening of the spherical connecting element 906 to the pedestal 920 and base 922.

Figure 14:
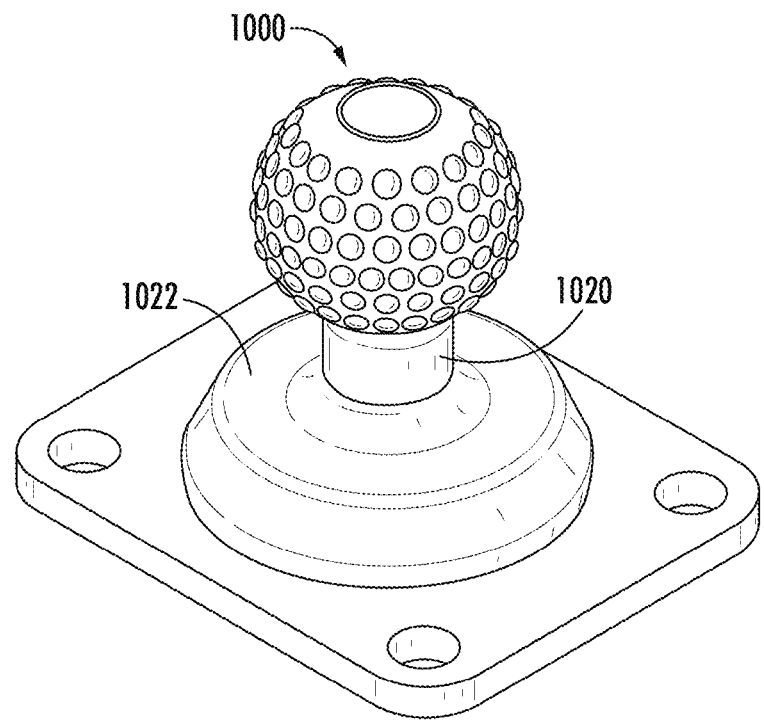
FIG. 14 is an isometric view of another illustrative ball mount assembly.
Figure 15:
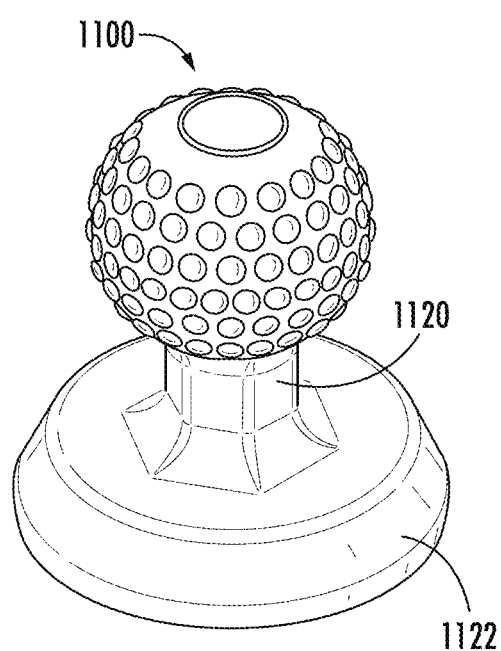
FIG. 15 is an isometric view of yet another illustrative ball mount assembly.
Figure 16A:
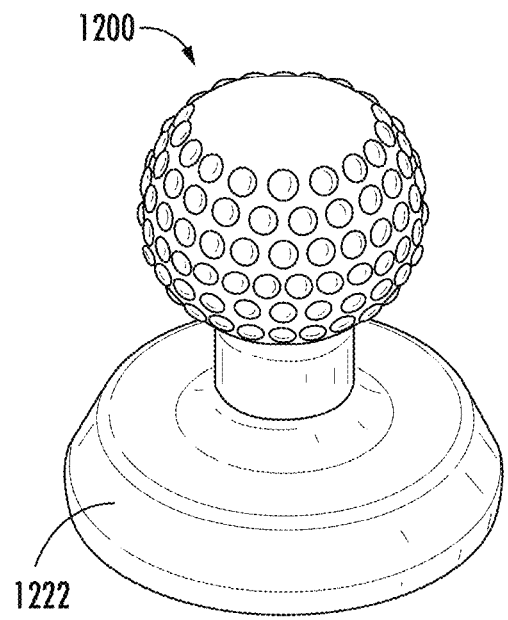
FIG. 16A is an isometric view of yet another illustrative ball mount assembly.
Figure 16B:
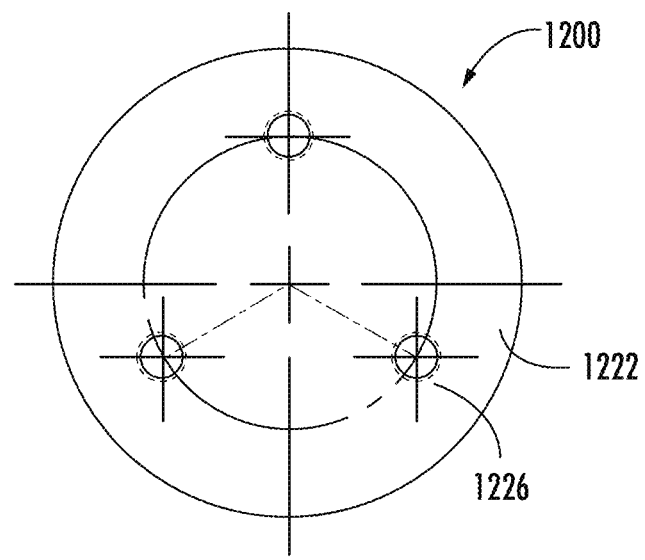
FIG. 16B is a bottom view of the ball mount assembly of FIG. 16A.

The base 922 and the pedestal 920 may also be shaped differently in various embodiments. For example, as shown in FIG. 14, a base 1022 and a pedestal 1020 of the ball mount 1000 may be cylindrical. In other embodiments, as shown in FIG. 15, at least one of a base 1122 or a pedestal 1120 may have a non-circular cross-sectional shape, such as a hexagonal shape, an octagonal shape, or any other geometric cross-sectional shape. The hexagonal shape of the pedestal 1120 in FIG. 14 may facilitate assembly operations by allowing a user to engage a wrench or other tool with the outer surfaces of the pedestal 1120. In some embodiments, the base (such as the base 1022 of FIG. 13) may be configured to engage with or includes a device mount, such as a panel mobile device clamp, or another mounting element. As shown in FIGS. 16A and 16B, a base 1222 of the ball mount 1200 may include fastener openings, such as openings 1226 to provide connection between the ball mount 1200 and a mobile device holder or vehicle mount. In other embodiments, the base may include clips or another form of interlock to facilitate mounting of the ball mount 1200 to a mobile device holder or vehicle mount.

Figure 17A:
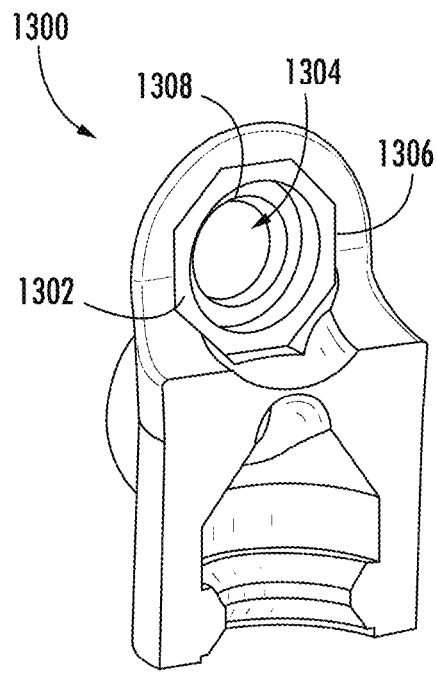
FIG. 17A is an isometric view of an illustrative clamp body of a ball clamp assembly.
Figure 17B:
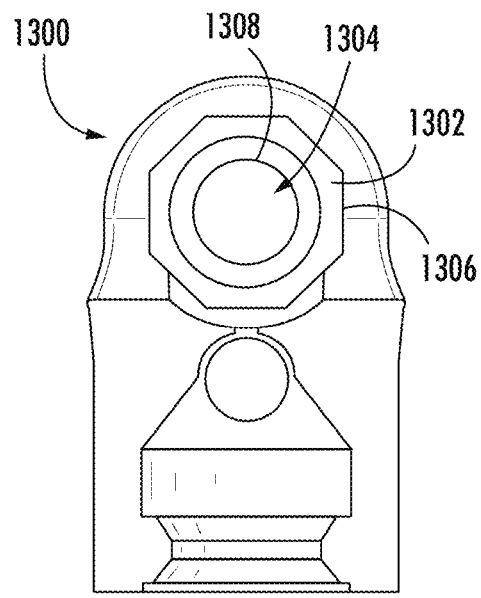
FIG. 17B is a front side view of the clamp body of FIG. 17A.

FIGS. 17A and 17B show an illustrative clamp body 1300 that can be used with any of the ball mount or connecting element structures described herein. The clamp body 1300 is structured to engage with a ball mount, such as the ball mount 502 and spherical connecting element 506 of FIG. 9, to prevent relative movement of the ball mount 502 within the clamp body 1300. The clamp body 1300 may have a similar design as described above with respect to the clamp body 304, but also includes an insert 1302 that is configured to facilitate engagement between the clamp body 1300 and the plurality of engaging elements of the ball mount.

The insert 1302 is disposed along an inner surface of the clamp body 1300 within a second recessed area 1304 of the clamp body 1300 that is configured to receive a portion of the spherical connecting element. The second recessed area 1304 may have a plurality of steps, including a first step 1306 and a second step 1308 that is circumscribed by the first step 1306. The plurality of steps may have a reducing diameter approaching a centermost point along the second recessed area 1304 to conform to the shape of the spherical connecting element (e.g., to nestably receive the spherical connecting element therein). In other embodiments, the second recessed area 1304 may have a semi-continuous or continuous radius of curvature. The first step 1306 and/or ledge may have a non-circular shaped outer perimeter that is reciprocal to a shape of an outer perimeter of the insert 1302. For example, the first step 1306 (and the insert 1302) may have a hexagonal shape, an octagonal shape, or any other non-circular shape to prevent relative movement between the insert 1302 and the clamp body 1300. The insert 1302 may be a ring of material that is pushed into or otherwise received within the second recessed area 1304. The insert 1302 may be removably coupled to the clamp body 1300 or fixedly coupled to the clamp body 1300 via a mechanical attachment, interference fit, adhesive product, chemical bond, weld, or other permanent coupling. In some embodiments, the insert 1302 may form one of the plurality of steps that are configured to engage with the spherical connecting element along at least an inner perimeter edge of the step.

Figure 18A:
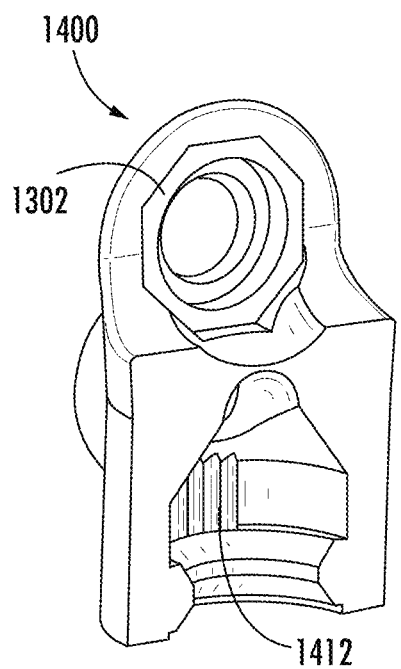
FIG. 18A is an isometric view of another illustrative clamp body of a ball clamp assembly.
Figure 18B:
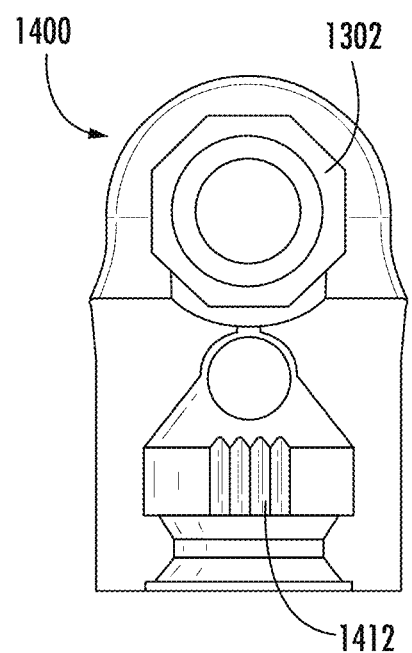
FIG. 18B is a front side view of the clamp body of FIG. 18A.

The insert 1302 may be configured to compress or deform to accommodate the plurality of engaging elements and to increase the holding force between the clamp body 1300 and the ball mount. The insert 1302 may be made from a different material than the clamp body 1300. For example, the insert 1302 may be formed from a material having reduced hardness relative to the material of the ball mount, such as a thermoplastic elastomer, rubber, silicon ring, and/or coating that is softer than the material of the ball mount (and the plurality of engaging elements) so that the insert 1302 can deform to accommodate a shape of the engaging elements. Using a softer material also provides energy absorption in response to shock or vibrational loads. In other embodiments, the insert 1302 can be made from a material of similar or slightly greater hardness as the clamp body 1300 that may still allow the engaging elements to bite into the insert material. As shown in FIGS. 17A and 17B, the insert 1302 can be used as a standalone anti-rotation feature of the clamp body 1300. In other embodiments, as shown in FIGS. 18A and 18B, the insert 1302 can be used with a clamp body 1400 that includes a second plurality of engaging elements 1412 that are configured to interact with reciprocal features on a connecting element (as described above with respect to FIGS. 6A and 6B).

Figure 19:
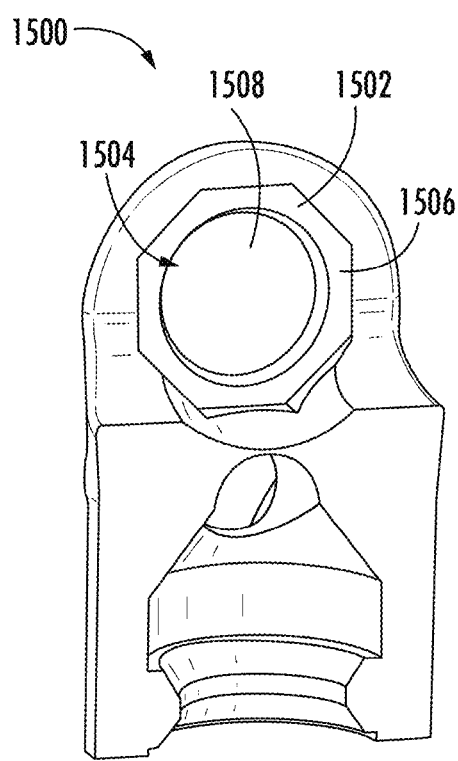
FIG. 19 is an isometric view of yet another illustrative clamp body of a ball clamp assembly.
Figure 20:
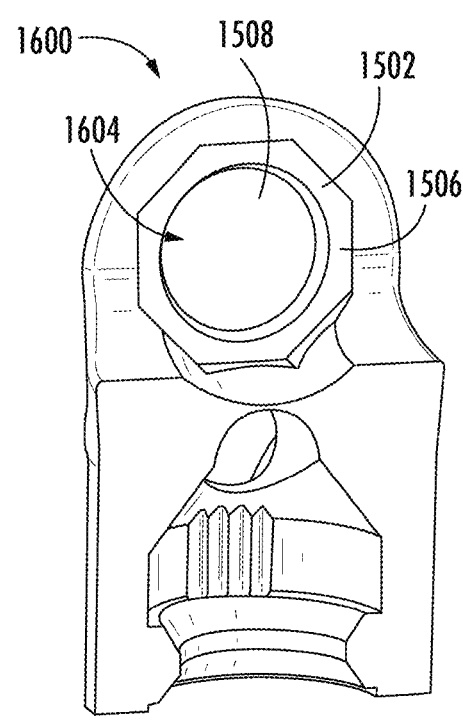
FIG. 20 is an isometric view of yet another illustrative clamp body of a ball clamp assembly.

It should be appreciated that the shape, size, and position of the insert 1302 may be different in other embodiments. For example, FIGS. 19 and 20 show clamp bodies 1500, 1600 that include an insert 1502 formed as a liner that extends across an entire width of a second recessed area 1504, 1604 of the clamp bodies 1500, 1600. The insert 1502 includes an outer wall 1506 extending along the perimeter of the second recessed area and a central piece 1508 (e.g., web, liner element, etc.) that is coupled to an inner perimeter of the outer wall 1506 and that fills an opening defined by the outer wall 1506. The central piece 1508 may have a substantially planer surface. In other embodiments, the central piece 1508 is curved radially into the second recessed area. The central piece 1508 may have a radius of curvature that is approximately equal to an outer radius of the spherical connecting element. Together, the outer wall 1506 and the central piece 1508 define a cylindrically-shaped recessed area. In other embodiments, the shape of the insert 1502 may be different.

Method of Assembling a Vehicular Mounting System

Figure 21:
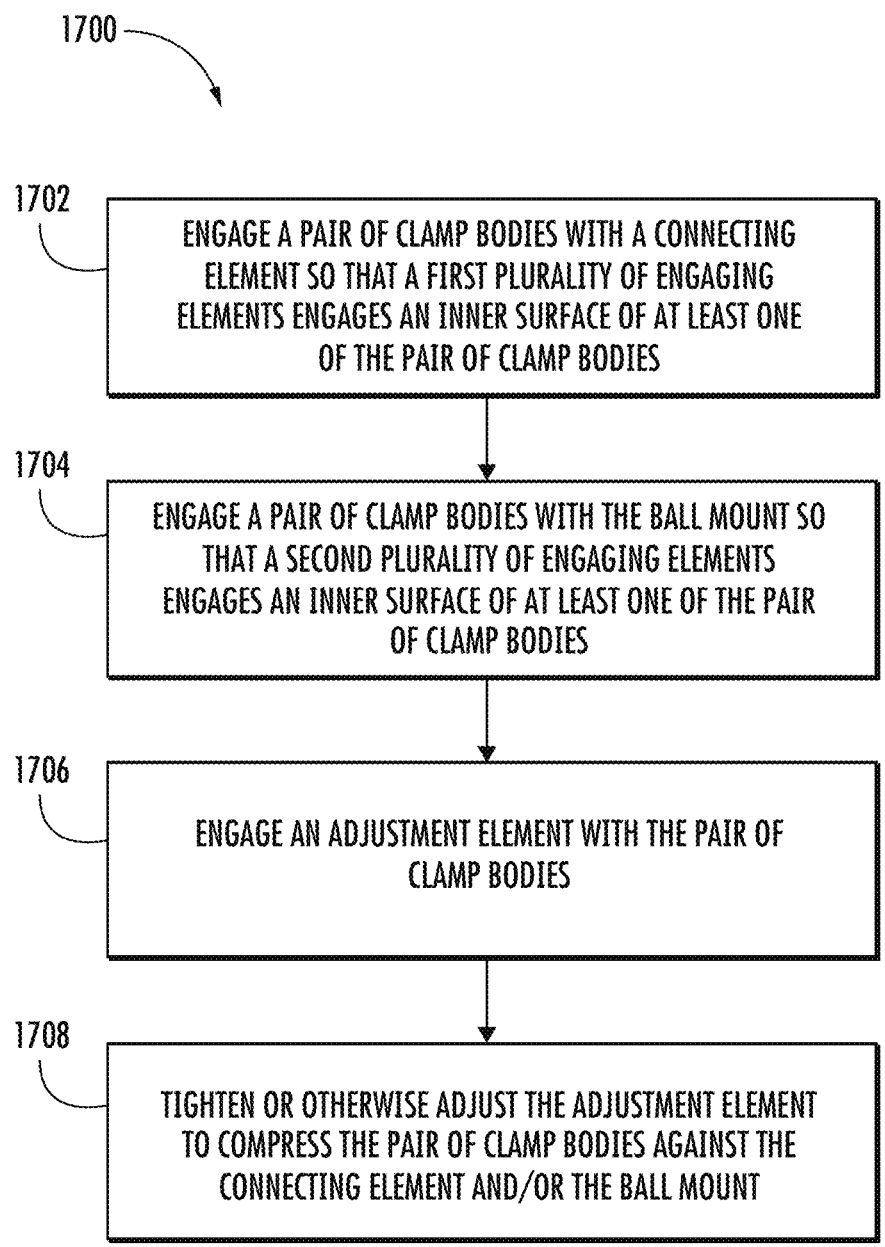
FIG. 21 is a flow diagram of an illustrative method of assembling a vehicular mounting system for supporting an electronic device.

FIG. 21 shows an illustrative method 1700 of assembling a clamp assembly of a vehicular mounting system, which may be performed using any of the clamp assembly and ball mount designs described herein. At 1702, a pair of clamp bodies may be engaged with a connecting element. Step 1702 may include aligning a recessed area in each of the pair of clamp bodies (e.g., a first recessed area of the clamp bodies) with the interface body of the connecting element that extends axially away from a circumferential flange of the connecting element. Step 1702 may include engaging the interface body to the pair of clamp bodies and within the recessed area of each one of the pair of clamp bodies so that (i) the interface body is at least partially sandwiched between the pair of clamp bodies, and (ii) a first plurality of engaging elements on the interface body engages an inner surface of at least one of the pair of clamp bodies. Inserting the interface body into the recessed area may further include engaging the plurality of engaging elements on the interface body with a second plurality of engaging elements in the recessed area of at least one clamp body that are shaped reciprocal to the plurality of engaging elements on the interface body.

At 1704, the pair of clamp bodies is engaged with the ball mount. Step 1704 may include aligning an opening formed between the pair of clamp bodies with a spherical connecting element of the ball mount, and inserting the spherical connecting element into the opening. Step 1704 may also include engaging the spherical connecting element to the pair of clamp bodies and within a recessed area of each one of the pair of clamp bodies (e.g., a second recessed area of the clamp bodies that is adjacent to the first recessed area) so that the spherical connecting element is sandwiched or otherwise disposed between the pair of clamp bodies, and so that a plurality of engaging elements along an outer surface of the spherical connecting element engages an inner surface of at least one of the pair of clamp bodies. For example, step 1704 may include engaging the plurality of engaging elements with an insert that is disposed within the recessed area of the clamp bodies.

At 1706, a fastener or other adjustment element may be inserted through the pair of clamp bodies, into a through-hole opening disposed in a central portion of the bodies, and between the first recessed area and the second recessed area. Step 1706 may include inserting the fastener into the through-hole opening and placing a nut onto a distal end of the fastener. In other embodiments, step 1706 may include threading the fastener into one of the openings in the clamp bodies. At 1708, the fastener or other adjustment element is tightened to compress the pair of clamp bodies against the connecting element and/or spherical connecting element. In other embodiments, method 1700 may include additional, fewer, and/or different operations. Although described as a pair of opposing clamp bodies, it should be understood that the number of clamp bodies may be more than two (e.g., three, four, or more) and provide for the same or similar function as two clamp bodies. In an alternative configuration, a single clamp body or mounting body that is configured with rotational or other flexible features so as to engage the connecting element with or without engagement elements (e.g., protrusions or indents). The connecting element may be spherical or have any other geometric shape (e.g., tubular, oval, etc.) that allows for rotation along at least one axis of rotation relative to a securing device (e.g., clamp).

As described, it should be understood that the features and functions presented herein may be applied to a number of uses and applications. For example, if the application is an optical system that needs stability and stiffness of optical mounts, but needs flexibility for initial setup, one or more of the anti-rotation features herein may be used. It should further be understood that mounting features for different vehicles and non-vehicles may be different (e.g., different shaped dashboards, roofs, equipment, temperature ranges, materials, etc.), but the anti-rotation features described herein may be utilized.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While the instant disclosure has been described above according to its preferred embodiments, it can be modified within the spirit and scope of this disclosure. This application is therefore intended to cover any variations, uses, or adaptations of the instant disclosure using the general principles disclosed herein. Further, the instant application is intended to cover such departures from the present disclosure as come within the known or customary practice in the art to which this disclosure pertains.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It is noted that any element disclosed in one embodiment may be incorporated or utilized with any other embodiment disclosed herein.

What is claimed is:

1. A mounting system for supporting an electronic device, comprising:
   a mount configured to enable securing the mounting system to a structural feature of a system in which the mounting system is being transported; and
   a connecting element coupled to the mount, the connecting element including:
      an interface body including a first body portion and a second body portion extending axially between an axial end of the connecting element and the first body portion, the second body portion having a reduced diameter relative to the first body portion, the first body portion defining a tapered surface extending to an axial end of the first body portion opposite the second body portion so that a first end of the tapered surface at the axial end of the first body portion has a reduced diameter relative to a second end of the tapered surface; and
      a first plurality of engaging elements disposed on the tapered surface of the first body portion, the first plurality of engaging elements extending along a perimeter of the first body portion, the first plurality of engaging elements configured to engage with a clamp body to substantially prevent rotation of the clamp body with respect to the connecting element, the first body portion including a linear portion extending along at least one engaging element of the first plurality of engaging elements, the linear portion extending parallel to a central axis of the connecting element.

2. The mounting system of claim 1, wherein the tapered surface is an at least partially radially-outward facing surface of the first body portion, the tapered surface defining an outer surface of the first body portion.

3. The mounting system of claim 2, wherein the outer surface of the at least partially radially-outward facing surface decreases in diameter size with increasing distance from the second body portion, the first plurality of engaging elements extending axially along the tapered surface.

4. A mounting system for supporting an electronic device, comprising:
   a mount configured to enable securing the mounting system to a structural feature of a system in which the mounting system is being transported;
   a connecting element coupled to the mount, the connecting element including:
      an interface body including a first body portion and a second body portion extending axially between an axial end of the connecting element and the first body portion, the second body portion having a reduced diameter relative to the first body portion, the first body portion defining a tapered surface extending to an axial end of the first body portion opposite the second body portion so that a first end of the tapered surface at the axial end of the first body portion has a reduced diameter relative to a second end of the tapered surface, the tapered surface being an at least partially radially-outward facing surface of the first body portion, the tapered surface defining an outer surface of the first body portion; and
      a first plurality of engaging elements disposed on the tapered surface of the first body portion, the first plurality of engaging elements extending along a perimeter of the first body portion, the first plurality of engaging elements configured to engage with a clamp body to substantially prevent rotation of the clamp body with respect to the connecting element; and
      a pair of opposing clamp bodies that includes the clamp body, the pair of opposing clamp bodies configured to engage with the at least partially radially-outward facing surface of the first body portion so as to allow the pair of opposing clamp bodies to angle inward towards one another under a radially compressive force applied to the pair of opposing clamp bodies.

5. The mounting system of claim 2, wherein the at least partially radially-outward facing surface curves when viewed along a reference plane oriented parallel to the central axis of the connecting element.

6. The mounting system of claim 1, wherein the first plurality of engaging elements are defined by a plurality of axially extending grooves in the tapered surface of the first body portion to form a plurality of teeth in the first body portion.

7. The mounting system of claim 1, wherein the first body portion includes a splined shaft that forms the first plurality of engaging elements.

8. The mounting system of claim 1, wherein the second body portion includes a first tapered surface, and a second tapered surface extending between the first tapered surface and the first body portion, the first tapered surface and the second tapered surface together forming a channel between the mount and the first body portion.

9. The mounting system of claim 1, wherein the connecting element further includes a plug extending axially away from the second body portion and into the mount.

10. The mounting system of claim 1, further comprising the clamp body configured to couple the connecting element to a ball mount device, the clamp body defining a recessed area and including a second plurality of engaging elements having an inward profile that is reciprocal to the first plurality of engaging elements.

11. The mounting system of claim 1, further comprising a pair of clamp bodies that includes the clamp body, the pair of clamp bodies configured to engage with the connecting element, each clamp body of the pair of clamp bodies defining a recessed area that is configured to receive a portion of the first body portion therein, the first plurality of engaging elements configured to engage an inner surface of the recessed area to prevent rotation of the connecting element relative to the pair of clamp bodies.

12. The mounting system of claim 1, wherein the first plurality of engaging elements extend in a repeating pattern along the perimeter of the first body portion .

13. The mounting system of claim 1, wherein the first plurality of engaging elements extend along an entire perimeter of the first body portion.

14. The mounting system of claim 1, wherein the connecting element further includes a flange disposed between the interface body and the mount.

15. A mounting system for supporting an electronic device, comprising:
a mount configured to enable securing the mounting system to a structural feature of a system in which the mounting system is being transported; and
a connecting element coupled to the mount, the connecting element including:
an interface body including a first body portion and a second body portion extending axially between an axial end of the connecting element and the first body portion, the second body portion having a reduced diameter relative to the first body portion, the first body portion defining a tapered surface extending to an axial end of the first body portion opposite the second body portion so that a first end of the tapered surface at the axial end of the first body portion has a reduced diameter relative to a second end of the tapered surface; and
a first plurality of engaging elements disposed on the tapered surface of the first body portion, the first plurality of engaging elements extending along a perimeter of the first body portion, the first plurality of engaging elements configured to engage with a clamp body to substantially prevent rotation of the clamp body with respect to the connecting element, the first plurality of engaging elements including a plurality of radial projections that are angled with respect to an axial direction such that a circumferential width of each of the first plurality of engaging elements varies along the axial direction.

16. The mounting system of claim 15, wherein the plurality of radial projections are triangular projections.

17. The mounting system of claim 1, wherein the linear portion is an inner radial edge defined by the at least one engaging element.

18. The mounting system of claim 17, wherein the at least one engaging element further defines an outer radial edge extending parallel to the inner radial edge.

19. The mounting system of claim 1, wherein the linear portion is an outer radial edge defined by the at least one engaging element.

20. The mounting system of claim 1, wherein the tapered surface defines a facet that extends from the axial end of the first body portion to an apex towards the second body portion.

21. A mounting system for supporting an electronic device, comprising:
a mount configured to enable securing the mounting system to a structural feature of a system in which the mounting system is being transported; and
a connecting element coupled to the mount, the connecting element including:
an interface body including a first body portion and a second body portion extending axially between an axial end of the connecting element and the first body portion, the second body portion having a reduced diameter relative to the first body portion, the first body portion defining a tapered surface extending to an axial end of the first body portion opposite the second body portion so that a first end of the tapered surface at the axial end of the first body portion has a reduced diameter relative to a second end of the tapered surface; and
a first plurality of engaging elements disposed on the tapered surface of the first body portion, the first plurality of engaging elements extending along a perimeter of the first body portion, the first plurality of engaging elements configured to engage with a clamp body to substantially prevent rotation of the clamp body with respect to the connecting element, the tapered surface defining a facet that extends from the axial end of the first body portion to an apex towards the second body portion, at least one of the first plurality of engaging elements defining a linear portion extending axially away from the apex and parallel to a central axis of the connecting element.

22. A mounting system for supporting an electronic device, comprising:
a mount configured to enable securing the mounting system to a structural feature of a system in which the mounting system is being transported; and
a connecting element coupled to the mount, the connecting element including:
an interface body including a first body portion and a second body portion extending axially between an axial end of the connecting element and the first body portion, the second body portion having a reduced diameter relative to the first body portion, the first body portion defining a tapered surface extending to an axial end of the first body portion opposite the second body portion so that a first end of the tapered surface at the axial end of the first body portion has a reduced diameter relative to a second end of the tapered surface; and
a first plurality of engaging elements disposed on the tapered surface of the first body portion, the first plurality of engaging elements extending along a perimeter of the first body portion, the first plurality of engaging elements configured to engage with a clamp body to substantially prevent rotation of the clamp body with respect to the connecting element, wherein the clamp body defines:
a through-hole opening extending radially through the clamp body; and
an inner surface extending normal to a central axis of the through-hole opening, the inner surface configured to engage the tapered surface of the first body portion so as to allow the clamp body to angle inward under a radially compressive force applied to the clamp body.

23. The mounting system of claim 1, wherein the connecting element defines a planar surface extending radially inwardly from the tapered surface at an axial end of the interface body opposite from the mount.

24. The mounting system of claim 1, further comprising a pair of opposing clamp bodies that includes the clamp body, the pair of opposing clamp bodies configured to engage with the tapered surface of the first body portion so as to allow the pair of opposing clamp bodies to angle inward towards one another under a radially compressive force applied to the pair of opposing clamp bodies.

25. The mounting system of claim 1, wherein the first plurality of engaging elements include a plurality of radial projections that are angled with respect to an axial direction such that a circumferential width of each of the first plurality of engaging elements varies along the axial direction.

26. The mounting system of claim 1, wherein the tapered surface defines a facet that extends from the axial end of the first body portion to an apex towards the second body portion, and wherein at least one of the first plurality of engaging elements defines the linear portion, the linear portion extending axially away from the apex.

27. The mounting system of claim 1, wherein the clamp body defines:
   a through-hole opening extending radially through the clamp body; and
   an inner surface extending normal to a central axis of the through-hole opening, the inner surface configured to engage the tapered surface of the first body portion so as to allow the clamp body to angle inward under a radially compressive force applied to the clamp body.

28. The mounting system of claim 4, wherein the first plurality of engaging elements include a plurality of radial projections that are angled with respect to an axial direction such that a circumferential width of each of the first plurality of engaging elements varies along the axial direction.

29. The mounting system of claim 4, wherein the tapered surface defines a facet that extends from the axial end of the first body portion to an apex towards the second body portion, and wherein at least one of the first plurality of engaging elements defines a linear portion extending axially away from the apex and parallel to a central axis of the connecting element.

30. The mounting system of claim 4, wherein the clamp body defines:
   a through-hole opening extending radially through the clamp body; and
   an inner surface extending normal to a central axis of the through-hole opening, the inner surface configured to engage the tapered surface of the first body portion so as to allow the clamp body to angle inward under the radially compressive force applied to the clamp body.

31. The mounting system of claim 15, wherein the tapered surface defines a facet that extends from the axial end of the first body portion to an apex towards the second body portion, and wherein at least one of the first plurality of engaging elements defines a linear portion extending axially away from the apex and parallel to a central axis of the connecting element.

32. The mounting system of claim 15, wherein the clamp body defines:
   a through-hole opening extending radially through the clamp body; and
   an inner surface extending normal to a central axis of the through-hole opening, the inner surface configured to engage the tapered surface of the first body portion so as to allow the clamp body to angle inward under a radially compressive force applied to the clamp body.

33. The mounting system of claim 21, wherein the clamp body defines:
   a through-hole opening extending radially through the clamp body; and
   an inner surface extending normal to a central axis of the through-hole opening, the inner surface configured to engage the tapered surface of the first body portion so as to allow the clamp body to angle inward under a radially compressive force applied to the clamp body.

* * * * *